US010128893B2

United States Patent
Sharma et al.

(10) Patent No.: US 10,128,893 B2
(45) Date of Patent: Nov. 13, 2018

(54) METHOD AND SYSTEM FOR PLANAR, MULTI-FUNCTION, MULTI-POWER SOURCED, LONG BATTERY LIFE RADIO COMMUNICATION APPLIANCE

(71) Applicant: SecureALL Corporation, Mountain View, CA (US)

(72) Inventors: Arun Kumar Sharma, Cupertino, CA (US); Michael Wurm, Redwood City, CA (US); Richard Schaffzin, Mountain View, CA (US); Prajakta Setty, Fremont, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

(21) Appl. No.: 15/473,224

(22) Filed: Mar. 29, 2017

(65) Prior Publication Data
US 2017/0338848 A1   Nov. 23, 2017

Related U.S. Application Data

(63) Continuation-in-part of application No. 14/444,949, filed on Jul. 28, 2014, now Pat. No. 9,642,089, and a
(Continued)

(51) Int. Cl.
*H04B 1/401* (2015.01)
*H04W 52/02* (2009.01)
(Continued)

(52) U.S. Cl.
CPC .............. *H04B 1/401* (2013.01); *H04B 1/16* (2013.01); *H04B 5/0062* (2013.01);
(Continued)

(58) Field of Classification Search
CPC ........ H04B 1/16; H04B 1/401; H04B 5/0062; H04W 52/02; H04W 52/0229; H04W 52/0235
See application file for complete search history.

(56) References Cited

U.S. PATENT DOCUMENTS 3,097,301 A   7/1963   Sharpe et al.
4,036,178 A   7/1977   Lee et al.
(Continued)

FOREIGN PATENT DOCUMENTS

CA   2597684 A1   7/2006
DE   19614362 C1   7/1997
(Continued)

OTHER PUBLICATIONS

Notification of Transmittal of International Search Report and Written Opinion by the International Searching Authority, International Search Report, Written Opinion, in PCT application PCT/US2013/032669; dated Jul. 10, 2013.
(Continued)

*Primary Examiner* — Leon Flores
(74) *Attorney, Agent, or Firm* — Haynes and Boone, LLP.

(57) ABSTRACT

A multifunction electronic key is provided with at least one wireless communication interface that can function as an access control key to unlock an electronic lock when the key is placed in proximity of an electronic lock that has been previously configured to allow temporal access to the said electronic key, and at least one of the following functions: a) Measure the electric field experienced by the device, process it and optionally send it to a second wireless device; b) A physical button to communicate a distress signal to a second wireless device, in response to which the second wireless device estimates the position of the electronic key and generates a system alarm indicating the identity of the electronic key that generated the alarm and its position
(Continued)

estimate; c) Measures the device's motion, process it and optionally send it to a second wireless device; d) One or two way audio communication via the wireless link; e) Measures ionizing radiation.

15 Claims, 13 Drawing Sheets

Related U.S. Application Data continuation-in-part of application No. 13/747,362, filed on Jan. 22, 2013, now Pat. No. 8,861,576, which is a continuation of application No. 12/500,587, filed on Jul. 9, 2009, now Pat. No. 8,472,507, said application No. 14/444,949 is a continuation-in-part of application No. 13/340,520, filed on Dec. 29, 2011, now Pat. No. 8,912,968, said application No. 14/444,949 is a continuation-in-part of application No. 13/691,626, filed on Nov. 30, 2012, now Pat. No. 9,414,300, said application No. 14/444,949 is a continuation-in-part of application No. 13/843,757, filed on Mar. 15, 2013, now abandoned, said application No. 14/444,949 is a continuation-in-part of application No. 13/841,079, filed on Mar. 15, 2013, now abandoned.

(60) Provisional application No. 61/858,821, filed on Jul. 26, 2013, provisional application No. 61/079,435, filed on Jul. 9, 2008, provisional application No. 61/428,155, filed on Dec. 29, 2010, provisional application No. 61/565,450, filed on Nov. 30, 2011, provisional application No. 61/611,577, filed on Mar. 16, 2012, provisional application No. 61/611,575, filed on Mar. 16, 2012.

(51) Int. Cl.
*H04B 1/16* (2006.01)
*H04B 5/00* (2006.01)

(52) U.S. Cl.
CPC ....... *H04W 52/02* (2013.01); *H04W 52/0229* (2013.01); *H04W 52/0235* (2013.01); *Y02D 70/00* (2018.01)

(56) References Cited

U.S. PATENT DOCUMENTS

| | | |
|---|---|---|
| 4,071,713 A | 1/1978 | Sencer |
| 4,200,871 A | 4/1980 | Roeder et al. |
| 4,839,640 A | 6/1989 | Ozer et al. |
| 4,853,704 A | 8/1989 | Diaz et al. |
| 4,855,749 A | 8/1989 | Defonzo |
| 4,898,010 A | 2/1990 | Futami et al. |
| 4,936,316 A | 6/1990 | Jewett |
| 4,978,965 A | 12/1990 | Mohuchy |
| 5,023,597 A | 6/1991 | Salisbury |
| 5,036,335 A | 7/1991 | Jairam |
| 5,187,489 A | 2/1993 | Whelan et al. |
| 5,252,960 A | 10/1993 | Duhame |
| 5,293,087 A | 3/1994 | Hamano et al. |
| 5,387,993 A | 2/1995 | Heller et al. |
| 5,473,318 A | 12/1995 | Martel |
| 5,485,577 A | 1/1996 | Eyer et al. |
| 5,515,036 A | 5/1996 | Waraksa et al. |
| 5,519,408 A | 5/1996 | Schnetzer |
| 5,530,839 A | 6/1996 | Komoto |
| 5,557,291 A | 9/1996 | Chu et al. |
| 5,586,121 A | 12/1996 | Moura et al. |
| 5,602,535 A | 2/1997 | Boyles et al. |
| 5,649,099 A | 7/1997 | Theimer et al. |
| 5,719,564 A | 2/1998 | Sears |
| 5,774,064 A | 6/1998 | Lambropoulos et al. |
| 5,815,811 A | 9/1998 | Pinard et al. |
| 5,878,134 A | 3/1999 | Handelman et al. |
| 5,922,049 A | 7/1999 | Radia et al. |
| 5,933,074 A | 8/1999 | Settles et al. |
| 5,940,510 A | 8/1999 | Curry et al. |
| 5,973,611 A | 10/1999 | Kulha et al. |
| 6,002,332 A | 12/1999 | King |
| 6,007,338 A | 12/1999 | Dinunzio et al. |
| 6,008,727 A | 12/1999 | Want et al. |
| 6,020,733 A | 2/2000 | Bradley |
| 6,041,411 A | 3/2000 | Wyatt |
| 6,043,785 A | 3/2000 | Marino |
| 6,064,309 A | 5/2000 | Sellers et al. |
| 6,097,301 A | 8/2000 | Tuttle |
| 6,107,934 A | 8/2000 | Andreou et al. |
| 6,111,977 A | 8/2000 | Scott et al. |
| 6,219,439 B1 | 4/2001 | Burger |
| 6,225,950 B1 | 5/2001 | Johansson et al. |
| 6,236,335 B1 | 5/2001 | Goodwin, III |
| 6,304,168 B1 | 10/2001 | Ohta et al. |
| 6,304,226 B1 | 10/2001 | Brown |
| 6,308,181 B1 | 10/2001 | Jarvis |
| 6,329,909 B1 | 12/2001 | Siedentop et al. |
| 6,337,628 B2 | 1/2002 | Campana, Jr. |
| 6,518,882 B2 | 2/2003 | Johnson et al. |
| 6,570,487 B1 | 5/2003 | Steeves |
| 6,690,259 B2 | 2/2004 | Aslanidis et al. |
| 6,713,895 B1 | 3/2004 | Krapfl |
| 6,816,083 B2 | 11/2004 | Brandt |
| 6,837,427 B2 | 1/2005 | Overhultz et al. |
| 6,873,703 B1 | 3/2005 | Enriquez |
| 6,876,334 B2 | 4/2005 | Song et al. |
| 6,888,459 B2 | 5/2005 | Stilp |
| 6,967,587 B2 | 11/2005 | Snell et al. |
| 6,972,660 B1 | 12/2005 | Montgomery, Jr. et al. |
| 6,989,732 B2 | 1/2006 | Fisher |
| 7,012,503 B2 | 3/2006 | Nielsen |
| 7,019,617 B2 | 3/2006 | Pratt et al. |
| 7,106,246 B1 | 9/2006 | Lindell |
| 7,142,838 B2 | 11/2006 | Rotzol |
| 7,149,849 B2 | 12/2006 | Wall et al. |
| 7,183,897 B2 | 2/2007 | Tang et al. |
| 7,199,634 B2 | 4/2007 | Cho et al. |
| 7,227,506 B1 | 6/2007 | Lewis, Jr. |
| 7,301,437 B2 | 11/2007 | Sasaki et al. |
| 7,366,812 B2 | 4/2008 | Lambourn et al. |
| 7,446,644 B2 | 11/2008 | Schaffzin et al. |
| 7,463,134 B1 | 12/2008 | Stilley |
| 7,487,538 B2 | 2/2009 | Mok |
| 7,499,283 B2 | 3/2009 | De Los Santos et al. |
| 7,526,934 B2 | 5/2009 | Conforti |
| 7,577,496 B2 | 8/2009 | Walker et al. |
| 7,617,522 B2 | 11/2009 | Schmidt et al. |
| 7,652,632 B2 | 1/2010 | Shtrom |
| 7,668,830 B2 | 2/2010 | Hakala |
| 7,688,179 B2 | 3/2010 | Kurpinski et al. |
| 7,689,196 B2 | 3/2010 | Hutchinson et al. |
| 7,755,482 B2 | 7/2010 | Hubbard |
| 7,792,861 B2 | 9/2010 | Kudoh et al. |
| 7,804,458 B2 | 9/2010 | Montgomery et al. |
| 7,805,169 B2 | 9/2010 | Hicks, III |
| 7,856,448 B2 | 12/2010 | Sheehan |
| 7,894,810 B2 | 2/2011 | Feher |
| 7,898,382 B2 | 3/2011 | Berstis et al. |
| 7,933,835 B2 | 4/2011 | Keane et al. |
| 7,933,925 B2 | 4/2011 | Sreedhar |
| 7,953,823 B2 | 5/2011 | Rider et al. |
| 8,005,777 B1 | 8/2011 | Owen et al. |
| 8,031,725 B2 | 10/2011 | Calin |
| 8,044,797 B2 | 10/2011 | Brommer et al. |
| 8,059,628 B2 | 11/2011 | Bradley et al. |
| 8,102,239 B2 | 1/2012 | Woo |
| 8,141,296 B2 | 3/2012 | Bem |
| 8,149,087 B2 | 4/2012 | Brillon |
| 8,194,571 B2 | 6/2012 | Herrmann et al. |
| 8,228,165 B2 | 7/2012 | Marchetto et al. |
| 8,233,420 B2 | 7/2012 | Choi et al. |

(56) References Cited

U.S. PATENT DOCUMENTS

| | | |
|---|---|---|
| 8,244,762 B2 | 8/2012 | Cimino |
| 8,245,291 B2 | 8/2012 | Kumar et al. |
| 8,249,910 B2 | 8/2012 | Wellman et al. |
| 8,251,287 B2 | 8/2012 | Kochevar |
| 8,258,920 B2 | 9/2012 | Crucs |
| 8,271,336 B2 | 9/2012 | Mikurak |
| 8,279,077 B1 | 10/2012 | Liff et al. |
| 8,310,340 B2 | 11/2012 | Sikora et al. |
| 8,319,605 B2 | 11/2012 | Hassan et al. |
| 8,340,975 B1 | 12/2012 | Roseberger |
| 8,391,260 B1 | 3/2013 | Kopikare et al. |
| 8,428,079 B1 | 4/2013 | Lambert et al. |
| 8,473,192 B2 | 6/2013 | Hannah et al. |
| 8,682,347 B2 | 3/2014 | Hepo-Oja |
| 8,693,453 B2 | 4/2014 | Priyantha et al. |
| 8,717,923 B2 | 5/2014 | Vedantham et al. |
| 9,007,173 B2 | 4/2015 | McIntyre et al. |
| 2002/0013909 A1 | 1/2002 | Baumeister et al. |
| 2002/0034321 A1 | 3/2002 | Saito et al. |
| 2002/0099945 A1 | 7/2002 | McLintock et al. |
| 2002/0111919 A1 | 8/2002 | Weller et al. |
| 2003/0034877 A1 | 2/2003 | Miller et al. |
| 2003/0046578 A1 | 3/2003 | Brown et al. |
| 2003/0119568 A1 | 6/2003 | Menard |
| 2003/0142737 A1 | 7/2003 | Tarng |
| 2003/0174095 A1 | 9/2003 | Sievenpiper |
| 2003/0214450 A1 | 11/2003 | Lynch et al. |
| 2004/0174271 A1 | 9/2004 | Welles et al. |
| 2004/0192222 A1 | 9/2004 | Vaisanen et al. |
| 2004/0227656 A1 | 11/2004 | Asakura et al. |
| 2004/0229560 A1 | 11/2004 | Maloney |
| 2004/0259544 A1 | 12/2004 | Amos |
| 2005/0040933 A1 | 2/2005 | Huntzicker |
| 2005/0063348 A1 | 3/2005 | Donovan |
| 2005/0138046 A1 | 6/2005 | Miettinen et al. |
| 2005/0215274 A1 | 9/2005 | Matson et al. |
| 2006/0008085 A1 | 1/2006 | Matsuo |
| 2006/0018139 A1 | 1/2006 | Kilomeitsev et al. |
| 2006/0030373 A1 | 2/2006 | Park |
| 2006/0100000 A1 | 5/2006 | Marples et al. |
| 2006/0129847 A1 | 6/2006 | Pitsos |
| 2006/0132284 A1 | 6/2006 | Murphy et al. |
| 2006/0136390 A1 | 6/2006 | Zhao et al. |
| 2006/0154708 A1 | 7/2006 | Bogner |
| 2006/0156018 A1 | 7/2006 | Lauer et al. |
| 2006/0164208 A1 | 7/2006 | Schaffzin et al. |
| 2006/0222118 A1 | 10/2006 | Murthy et al. |
| 2007/0001816 A1 | 1/2007 | Lindley et al. |
| 2007/0038344 A1* | 2/2007 | Oota ............... B60R 25/2009 701/49 |
| 2007/0073694 A1 | 3/2007 | Picault et al. |
| 2007/0103367 A1 | 5/2007 | Wang |
| 2007/0105548 A1 | 5/2007 | Mohan et al. |
| 2007/0111746 A1 | 5/2007 | Anderson |
| 2007/0149257 A1 | 6/2007 | Cheresh et al. |
| 2007/0176739 A1 | 8/2007 | Raheman |
| 2007/0183449 A1 | 8/2007 | Beagley et al. |
| 2007/0188305 A1 | 8/2007 | Drucker |
| 2007/0273478 A1 | 11/2007 | Chevalier |
| 2007/0286136 A1 | 12/2007 | Rittle et al. |
| 2007/0296545 A1 | 12/2007 | Clare |
| 2008/0031208 A1 | 2/2008 | Abhishek et al. |
| 2008/0062120 A1* | 3/2008 | Wheeler ............ G08B 25/016 345/156 |
| 2008/0084836 A1 | 4/2008 | Baird et al. |
| 2008/0088514 A1 | 4/2008 | Su et al. |
| 2008/0129446 A1 | 6/2008 | Vader |
| 2008/0129448 A1 | 6/2008 | Reichling |
| 2008/0191009 A1 | 8/2008 | Gressel et al. |
| 2008/0231522 A1 | 9/2008 | Montgomery et al. |
| 2008/0252432 A1* | 10/2008 | Hein .................. G08C 17/02 340/426.14 |
| 2008/0290990 A1 | 11/2008 | Schaffzin et al. |
| 2008/0303601 A1 | 12/2008 | Young |
| 2008/0316128 A1 | 12/2008 | Apostolos |
| 2009/0007274 A1 | 1/2009 | Martinez et al. |
| 2009/0110035 A1 | 4/2009 | Sutton et al. |
| 2009/0238308 A1 | 9/2009 | Weiner et al. |
| 2009/0262036 A1 | 10/2009 | Thevenard et al. |
| 2009/0267734 A1 | 10/2009 | Kwon |
| 2009/0267747 A1 | 10/2009 | Rivest et al. |
| 2009/0287827 A1 | 11/2009 | Horn et al. |
| 2009/0303131 A1 | 12/2009 | Schano |
| 2009/0305628 A1 | 12/2009 | Vavik |
| 2010/0035539 A1 | 2/2010 | Yoshida et al. |
| 2010/0036861 A1 | 2/2010 | Srihari et al. |
| 2010/0040120 A1 | 2/2010 | Sharma |
| 2010/0052931 A1 | 3/2010 | Kolpasky et al. |
| 2010/0075655 A1* | 3/2010 | Howarter ............ B60R 25/2009 455/420 |
| 2010/0077474 A1 | 3/2010 | Yacoub et al. |
| 2010/0141381 A1 | 6/2010 | Bliding et al. |
| 2010/0164683 A1 | 7/2010 | Sharma et al. |
| 2010/0167783 A1 | 7/2010 | Alameh et al. |
| 2010/0260114 A1 | 10/2010 | Vermani et al. |
| 2010/0283579 A1 | 11/2010 | Kraus et al. |
| 2011/0001606 A1 | 1/2011 | Charych |
| 2011/0069649 A1 | 3/2011 | Gobriel et al. |
| 2011/0102164 A1* | 5/2011 | Ghabra ............... B60R 25/04 340/426.13 |
| 2011/0161697 A1 | 6/2011 | Qi et al. |
| 2011/0221565 A1 | 9/2011 | Ludlow et al. |
| 2012/0030733 A1 | 2/2012 | Andrews et al. |
| 2012/0045989 A1 | 2/2012 | Suumaki et al. |
| 2012/0096564 A1 | 4/2012 | Li |
| 2012/0170751 A1 | 7/2012 | Wurm |
| 2012/0221189 A1 | 8/2012 | Konet et al. |
| 2012/0274444 A1 | 11/2012 | Micali et al. |
| 2012/0296685 A1 | 11/2012 | Nishimura et al. |
| 2012/0305340 A1 | 12/2012 | Wu |
| 2013/0006680 A1 | 1/2013 | O'Sullivan |
| 2013/0028293 A1 | 1/2013 | Makh et al. |
| 2013/0054976 A1 | 2/2013 | Brown et al. |
| 2013/0109313 A1 | 5/2013 | Kneckt et al. |
| 2013/0109314 A1 | 5/2013 | Kneckt et al. |
| 2013/0155925 A1 | 6/2013 | Priyantha et al. |
| 2013/0237193 A1 | 9/2013 | Dumas et al. |
| 2014/0281566 A1 | 9/2014 | Narendra et al. |
| 2015/0102904 A1 | 4/2015 | Oh et al. |
| 2015/0135310 A1 | 5/2015 | Lee |
| 2015/0263663 A1 | 9/2015 | Lazo et al. |

FOREIGN PATENT DOCUMENTS

| | | |
|---|---|---|
| EP | 0808971 A2 | 11/1997 |
| EP | 1184236 A2 | 3/2002 |
| EP | 1450312 A2 | 8/2004 |
| EP | 1841630 A2 | 10/2007 |
| KR | 100361/2007 A2 | 10/2007 |
| TW | 200626782 A | 8/2006 |
| WO | 2005059752 A1 | 6/2005 |
| WO | 2006/078362 A2 | 7/2006 |

OTHER PUBLICATIONS

European Search Report dated Feb. 9, 2010, in European Application No. 05849475.8.

Fischetti, M. titled Keyless Entry, Scientific American, 3 pages, (Jan. 2005).

Written Opinion of the International Searching Authority, International Application No. PCT/US05/044250, dated Aug. 24, 2007, 5 pages.

International Preliminary Report on Patentability, International Application No. PCT/US05/044250, dated Sep. 18, 2007, 2 pages.

International Search Report issued by the International Searching Authority for PCT application No. PCT/US05/044250, dated Nov. 14, 2007, 2 pages.

John Long titled SiGe Radio Frequency ICs for Low-Power Portable communication; Proceedings of the IEEE, vol. 93, No. 9, Sep. 2005. 26 pages.

(56) References Cited

OTHER PUBLICATIONS

International Search Report and Writtenn Opinion issued by the International Searching Authority dated Feb. 19, 2010 for PCT application No. PCT/US2011/067981. 10 pages.
International Search Report and Written Opinion issued by the International Searching Authority, dated Feb. 19, 2010 for PCT application. No. PCT/US2009/050180.
Liapine, A., titled Resonant Cavities as Beam Position Monitors, Part 3. Analog Signal Processing. Accelerator Physicist, Department of Physics, University of London, UK. Received Apr. 10, 2012. http://www.hep.ucl.ac.uk/~liapine. 6 pages.
Barry, John R., titled Carrier Synchronization for Homodyne and Heterodyne Detection of Optical Quadriphase-Shift Keying. Department of EECS, University of California, issued Jul. 2, 1992. 36 pages.
Mirabbasi, Shahriar et al. titled Classical and Modern Receiver Architectures. IEEE Communications Magazines issued Nov. 2008. 8 pages.
Office Action dated Jul. 2, 2013 in Japanese patent application No. 2011-517638 based on PCT application No. PCT/US2009/050180.
English Translation of Office Action dated Jul. 2, 2013 in Japanese patent application No. 2011-517638.
Partial English Translation of Japanese application No. 2005-286745.
Polastre, Joseph et al. titled Versatile Low Power Media Access for Wireless Sensor Networks. SenSys '04, Nov. 3-5, 2004. Baltimore, Maryland.
A. El-Hoiydi et al., titled Low Power MAC Protocols for Infrastructure Wireless Sensor Networks. Nov. 15, 2012.
Ye, Wei et al., titled An Energy-Efficient MAC Protocol for Wireless Sensor Networks, (2002), 7 pages.
CMPE 25: Wireless and Mobile Networking SET 3p: Medium Access Control Protocols, 2004.
Buettner, Michael et al., titled X-MAC: A Short Preamble MAC Protocol for Duty-Cycled Wireless Sensor Networks. SenSys '06, Nov. 1-3, 2006.
Chao, Chih-Min et al., titled A Quorum-Based Energy-Saving MAC Protocol Design for Wireless Sensor Networks. IEEE Transactions on Vehicular Technology, vol. 59, No. 2, Feb. 2010.
Tseng, Yu-Ghee et al., titled Power-Saving Protocols for IEEE 802.11-Based Multi-Hop Ad Hoc Networks. IEEE INFOCOM 2002.
Li, Yuan et al., titled Energy and Latency Control in Low Duty Cycle MAC Protocols. USC/ISI Technical Report ISI-TR-595, Aug. 2004.
Dutta, Prabal et al., titled Practical Asynchronous Neighbor Discovery and Rendezvous for Mobile Sensing Applications. SenSys '08, Nov. 5-7, 2008, Raleigh, NC, USA (ACM).
Kandhalu, Arvind et al., titled U-Connect: A Low-Latency Energy-Efficient Asynchronous Neighbor Discovery Protocol. IPSN '10, Apr. 12-16, 2010, Stockholm, Sweden (ACM).
Lai, Shouwen, titled Heterogeneous Quorum-Based Wakeup Scheduling for Duty-Cycled Wireless Sensor Networks, Dissertation. May 5, 2009, 71 pages.
Meier, Andreas titled Analyzing MAC Protocols for Low Data-Rate Applications. May 16, 2006. Computer Engineering and Networks Laboratory. 16 pages.
International Search Report and Written Opinion issued by the International Searching Authority, dated Mar. 14, 2013 for PCT application No. PCT/US2012/067478. 7 pages.
International Search Report and Written Opinion issued by the International Searching Authority dated Jul. 8, 2013 for PCT application No. PCT/US2013/032620. 16 pages.

\* cited by examiner perspective view
(Part of specification in US20120169543)

Cross section

Exploded view

Cross section

Exploded view

Top view

Cross section

Cross section

Exploded view

Top view

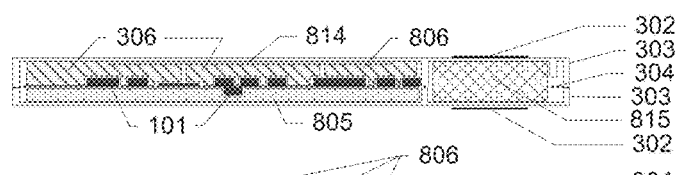
FIG. 5A
FIG. 5B
Multiple types of energy harvesting transducers
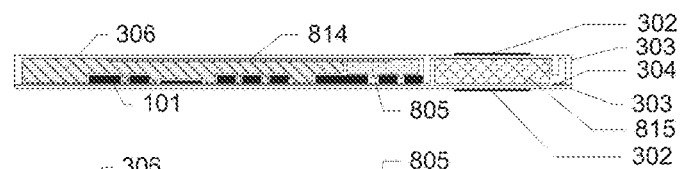
FIG. 6A
FIG. 6B
Multiple types of energy harvesting transducers
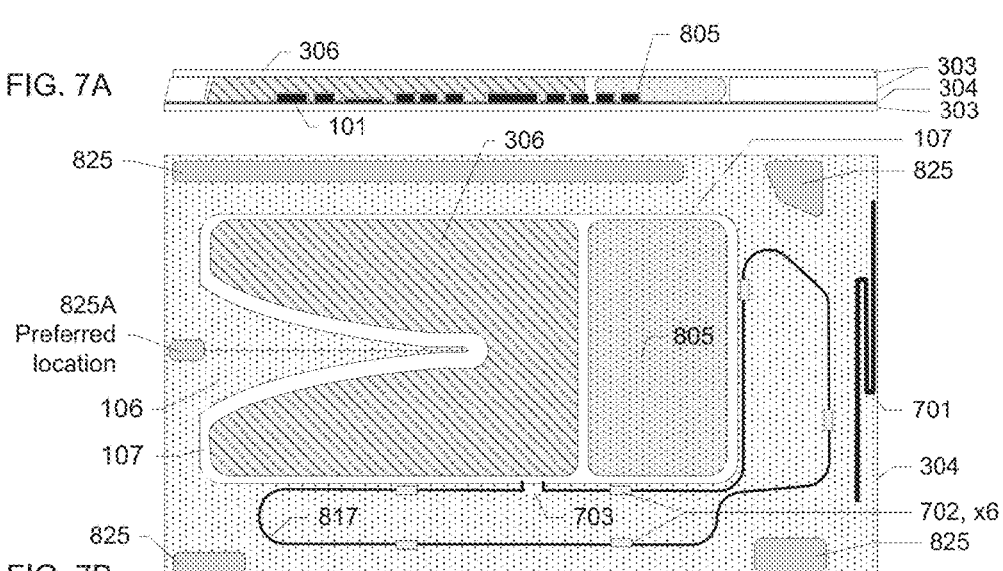
FIG. 7A
FIG. 7B
Badge format Ekey with Loop antenna and E-field electrodes Ekey block diagram Badge hanger ES EHVD Force transfer Triangle shaped steerable beam Antenna array Overlapping tracker antenna beams Cylindrical shaped steerable beam Antenna array

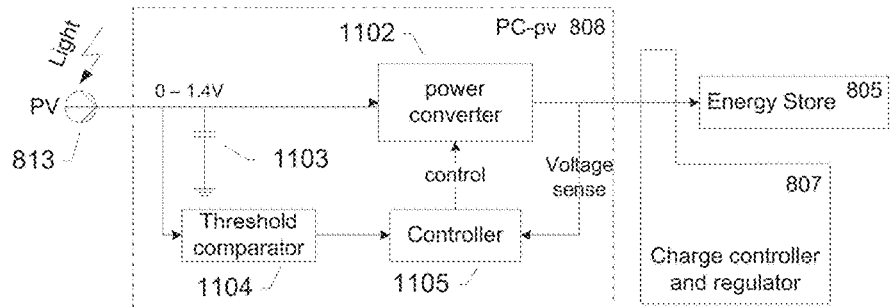
FIG. 11 A : PV harvesting & power converter
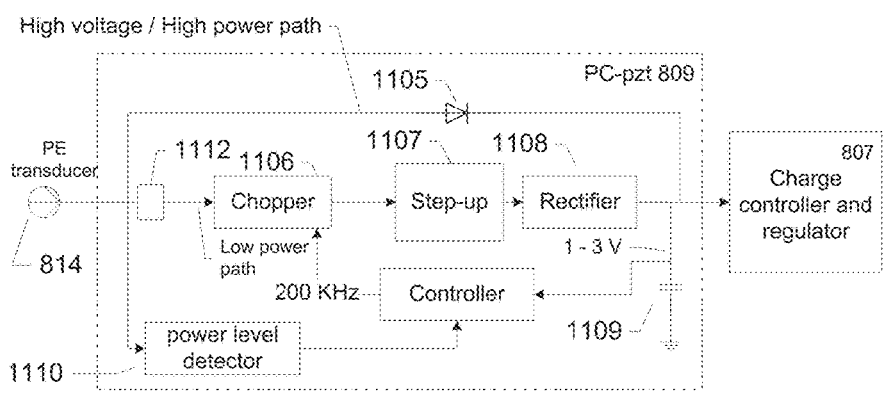
FIG. 11 B : PE harvesting & power converter
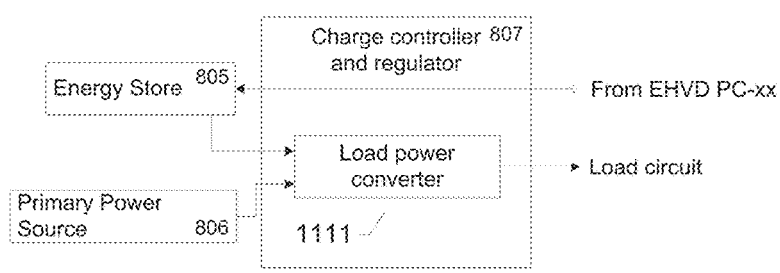
FIG. 11 C : Load Power converter

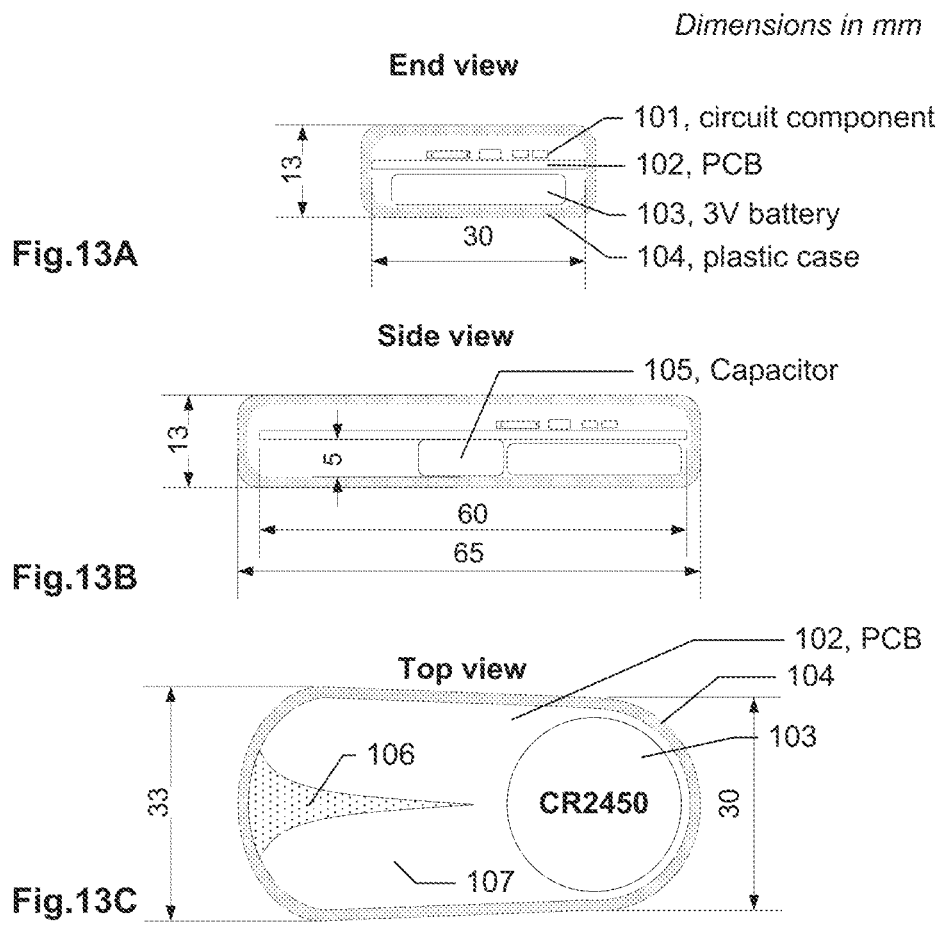
Fig.13A End view — 101, circuit component; 102, PCB; 103, 3V battery; 104, plastic case
Fig.13B Side view — 105, Capacitor
Fig.13C Top view
Dimensions in mm
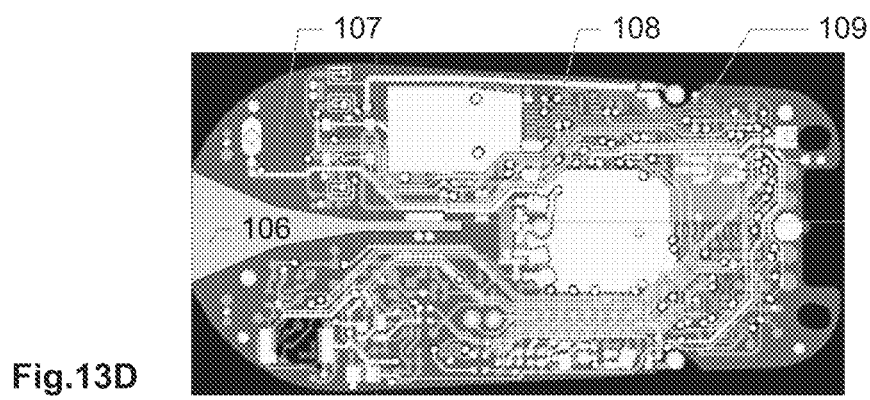
Fig.13D Detailed photo of multi-layer PCB layout.
As per US20120169543

FIG. 14, planar structure with multiple antennas operating on different frequencies (as described in US20120169543 specification)

METHOD AND SYSTEM FOR PLANAR, MULTI-FUNCTION, MULTI-POWER SOURCED, LONG BATTERY LIFE RADIO COMMUNICATION APPLIANCE

CROSS REFERENCE TO RELATED APPLICATIONS

The present application is a continuation-in-part (CIP) of U.S. patent application Ser. No. 14/444,949, filed on Jul. 28, 2014, incorporated herein by reference, which claims priority of U.S. provisional patent application No. 61/858,821, filed Jul. 26, 2013, incorporated herein by reference.

The aforementioned application Ser. No. 14/444,949 is also:

2. A continuation-in-part (CIP) of U.S. patent application Ser. No. 13/747,362 filed on Jan. 22, 2013, incorporated herein by reference, which is a continuation of U.S. patent application of U.S. patent application Ser. No. 12/500,587 filed Jul. 9, 2009 (now U.S. Pat. No. 8,472,507), which application is incorporated herein by reference, which claims priority of U.S. provisional patent application 61/079,435 filed Jul. 9, 2008, incorporated herein by reference.

3. A continuation-in-part of U.S. patent application Ser. No. 13/340,520, filed Dec. 29, 2011, incorporated herein by reference, which claims priority of U.S. provisional patent application No. 61/428,155 filed Dec. 29, 2010, incorporated herein by reference.

4. A continuation-in-part of U.S. patent application Ser. No. 13/691,626 filed Nov. 30, 2012, incorporated herein by reference, which claims priority of U.S. provisional patent application No. 61/565,450 filed Nov. 30, 2011, incorporated herein by reference.

5. A continuation-in-part of U.S. patent application Ser. No. 13/843,757 filed Mar. 15, 2013, incorporated herein by reference, which claims priority of U.S. provisional patent application No. 61/611,577 filed Mar. 16, 2012, incorporated herein by reference.

6. A continuation-in-part of U.S. patent application Ser. No. 13/841,079 filed Mar. 15, 2013, incorporated herein by reference, which claims priority of U.S. provisional patent application No. 61/611,575 filed Mar. 16, 2012, incorporated herein by reference.

GLOSSARY/NOTATION

1. ASIC: Application specific integrated circuit
2. ASS: Application Software Server
3. EDL: Electronic Door Lock
4. EHVD: Energy HarVesting device (E.g. Photo voltaic cell, Piezo-electric transducer, voice coil, peltier pile)
5. Ecall: Emergency Call, Distress Call
6. Ekey/E-Key: Electronic Key (for door access control, authorized access to resources/computer/lab equipment)
7. EM: Electro-Mechanical transducer
8. ES: Energy storing device (E.g. Super capacitor, rechargeable battery)
9. EST: Electrostrictive transducer
10. FPC: Flexible printed circuits, a type of PCB.
11. FPVC: Flexible Photo Voltaic Cell
12. Locator: A devices that discovers Ekeys and determine its gross location.
13. NFC: Near Field communication
14. ODA/OD Antenna: An Isotropic antenna disclosed in US20120169543
15. PPS: Primary Power Source
16. PCB: Printed circuit board.
17. PVC/PV cell: Photo voltaic cell, solar cell
18. PE: Piezoelectric and/or electrostrictive transducer
19. PE EHVD: Piezoelectric and/or electrostrictive transducer based Energy HarVesting device
20. PZT: Piezo Electric Transducer
21. RFID: Radio frequency identification
22. RF: Radio Frequency
23. RSSI: Received Signal Strength Indicator
24. TOF: Time of Flight
25. Tracker: Tracker is type of Locator.
26. UKey/Ukey: A type of Ekey made by SecureALL that works in hand free manner.

BACKGROUND OF THE INVENTION

This invention relates to realization of a multi-function portable wireless device. Some embodiments have an extremely low profile (meaning the thickness is a small fraction of width or height of the device). In some embodiments, the device is powered by multiple types of energy sources and energy storing methods. (An energy source can be solar power, vibration energy harvesting, Peltier thermo-electric array, dry cell, and/or some other source; rechargeable energy storage may include a rechargeable battery and/or super capacitor and/or some other type).

Some embodiments relate to long battery endurance electronic devices, wireless communication systems, RFID and tracking systems. Some embodiments are suitable for systems with devices where one or more of them are mobile.

A Ukey device available from SecureALL Corporation of California has been in use for the last few years, and has many breakthrough technologies that enable a hand-free key to provide door access. Namely the extremely long battery life due to ELP (extreme-low-power) technology, omni-directional (isotropic) antenna, low energy intensive cryptography (see US Pre-Grant Patent Publication 2012/0170751, incorporated herein by reference) and communication protocol (see US Pre-Grant Patent Publication 2013/0247153, incorporated herein by reference), which enable Access control information communication, efficient information synchronization etc.

Using the ELP energy conservation techniques (U.S. pre-grant patent publication no. US 2010/0040120, incorporated herein by reference), the omni-directional antenna (reliable RF link budget, US pre-grant patent publication no. US 20120169543, incorporated herein by reference), energy conserving communication can be achieved that allows a battery to operate for longer duration and/or more energy consuming functionality be added to the device. The present document discloses additional multiple new functions and innovative design elements in a future UKey, active RFID tag and sensor node; the disclosure can as well be applied to other appliances that require operating under limited energy and power constraints.

This document discloses methods to further increase battery life of an exemplary embodiment shown below as Ekey 240 (using CR2450 cell) from currently 4.5 years by a few times, or eliminate the need for a battery altogether. It also discloses methods to change the form factor to make it very thin (of the order of the thickness of current RFID access cards).

Conventional passive RFID technology suffers from an extremely short communication range (typically 5-30 cm) with an RFID reader, and its RFID readers requires very high operating power requiring main power operation or large batteries. It has low data rate and small data payload.

Prior art semi-active RFID tags technology requires a battery, and communicates over a longer range (typically 1-30 m) compared to passive RFID tags. The onboard battery is used only to provide power for telemetry and backscatter enabling circuits on the tag, not to generate RF energy directly. These systems have a low data rate and small-medium data payload. The RFID reader can be as power hungry as passive RFID reader.

The prior art active RFID systems have comparatively longer operating range (10-80 m) but require larger batteries for a reasonable battery change frequency. They provide high data rates and support larger data payloads. Its RFID reader is much less power hungry compared to passive RFID reader. Exemplary active-RFID products are available from AeroScout, WhereNet and PanGo.

Due to battery and antenna considerations the conventional active RFID devices have a rather tall profile that makes it uncomfortable to carry them in a pocket or wallet. There is a user demand for low profile electronic devices that can easily be carried in a pocket or a wallet. The present disclosure teaches methods to realize low profile electronic devices/appliances (appliances that are smart, multi-functional and that require no battery replacement). In some embodiments the battery is sealed in the case, or the device may not even have a primary battery (non-rechargeable battery).

A related problem in access control, people tracking and asset tracking is to be able to locate the relative position of the active electronic device in a cost effective way. Prior art technologies exist but they have the following significant disadvantages:

1. Direction Triangulation: Requires the space to be covered by two or more readers with direction finding capability.
2. Distance triangulation: Requires readers that can measure distance with the tag (time of flight measurement) and the desired space to be covered by two or more readers.

An embodiment of this disclosure teaches the combined use of Time of flight (to get distance estimate) and a steerable beam (get directional estimate) to estimate the location of the tag. This method is much more cost effective as a standalone reader can provide positioning without requiring complex cabling or communication between multiple readers.

Some embodiments provide a multi-function Ekey 240 that is planar and low-profile like conventional passive RFID cards: the size of about a credit card and about 1 to 4 mm thickness. A preferred embodiment is about 60'30×2.5 mm.

SecureALL's customers love Ekeys (Model-UKN), the current product functionality and form factor; however, some users want it in a format like an employee badge that can be imprinted with a photo and other information. Such a form factor finds easy user acceptance because most already wear their employee badge (a pouch contains the employee badge, along with RFID proximity card in a transparent plastic pouch that has a clip attached to attach to a person's dress). After work they put the card in the wallet or along the wallet in their pockets. This disclosure teaches methods to use energy harvesting methods that significantly increase battery life exploiting the way the users typically use the Ekey at work and off-work.

SUMMARY

Some embodiments are described below.

BRIEF DESCRIPTION OF THE DRAWINGS

FIGS. 3A, 3B, 3C, 3D, 3E, 4A, 4B, 4C, 5A, 5B, 6A, 6B, 7A and 7B show various embodiments of the disclosure that reduces the form factor of the multi-functional Ekey.

FIGS. 11A, 11B, 11C shows energy harvesting and charge controller bock diagram for various energy sources.

FIGS. 13A, 13B illustrates a typical Ekey packaging.

FIGS. 13C, 13D illustrates a typical (disclosed in patent application Ser. No. 13/340,520) Ekey exemplified with those Ekeys that use Omni directional antenna

DESCRIPTION OF SOME EMBODIMENTS

Figure 1:
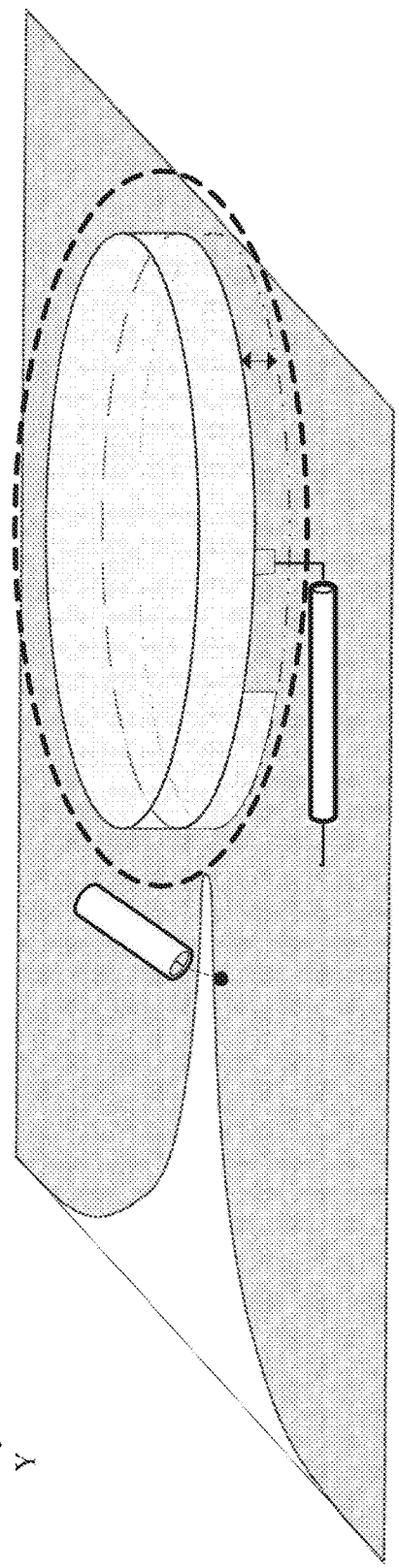
FIG. 1 illustrates a typical Ekey (disclosed in patent application U.S. Pat. No. 13/340,520) exemplified with those Ekeys that use Omni directional antenna

SecureALL's Ekey consumes very low power and energy such that with a CR2450 battery it can typically last many years of operation before requiring battery change. The market requirement is to use smaller batteries so that the thickness of the Ekey can be reduced to be similar to a proximity RFID card. And to add more functionality to the Ekey. Thus this disclosure teaches methods to make an even smaller form factor Ekey 240 with more functionality and almost indefinite battery life.

The embodiments described in this section illustrate but do not limit the invention. The invention is defined by the appended claims.

Numbering system: OPXX,
1) OP: Figure number where it was first specified and defined. "O" is optional when Figure number is single digit.
2) XX: Last two numerals FIGS. 21A, 21B, 21C, 21D show various components of the previously disclosed SecureALL Corporation's "UKN" model (UKey™) which is a type of E-Key. E-Keys from other vendors have some aspects that are similar to SecureALL's "UKN" model.

The figures in FIGS. 13A, 13B, 13C show the typical dimensions of the E-Key. The thickness is typically defined by packaging constraints of the electronics. At 13 mm thickness it is rather uncomfortable to put that in a wallet.

FIGS. 13A and 13B show the end view and side view. 13C is the plan view. The circuit is realized by soldering the circuit components 101 on a Printed Circuit Board (PCB) 102. Most components are reflow soldered using contemporary surface mount technology (SMT). Other circuit components (E.g. large value energy storage (ES) capacitor 105) could be manually soldered or press-fitted. The PCB could employ a rigid dielectric substrate (E.g. FR4) or a flexible substrate (E.g. Flexible Printed Circuit (FPC)). A battery 103 is typically connected and secured to the PCB via a battery holder/clip. For example SecureALL's UKN employs coin-cell CR2450 battery (3 Volt/640 mAH rating and measuring 24.5×5 mm)). The plastic enclosure (104) provides physical protection to the electronics.

FIG. 13C shows the top view. It also shows SecureALL's "UKN" with integrated PCB and antenna (as taught in SecureALL's US patent application US 20120169543, True omni-directional antenna). The conducting ground plane 107 of the PCB 102 is shaped to have a flared aperture 106 that only has PCB substrate dielectric, forming a wideband, pseudo-isotropic antenna. FIG. 13D shows an image of the PCB Gerber file where the ground plane 107 is also used for circuit interconnection to connect various components on both sides of the PCB. Top layer 110 and bottom layer 109 provide conventional PCB traces and pads to allow soldering of components and interconnect them. Double-sided SMT assembly is a well known prior art.

FIG. 1 is a perspective view of the SecureALL's "UKN", (as taught in SecureALL's US patent application US 20120169543) where one can see that the thickness of the E-Key is due to battery and/or antenna packaging constraints.

Figure 14A:
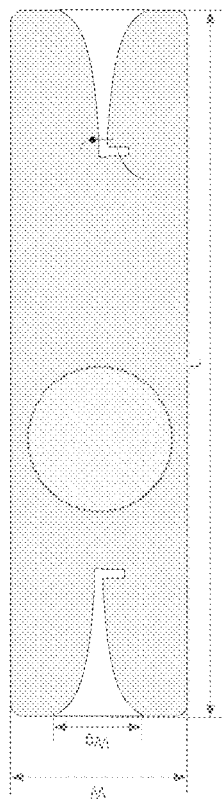
FIGS. 14A, 14B, 14C shows previously disclosed antenna methods to implement multiple antennas in a device that operate at different frequencies.
Figure 14C:
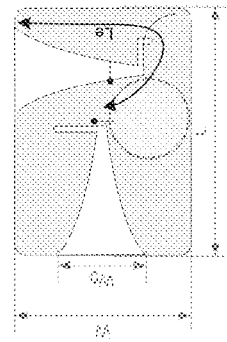
Figure 14B:
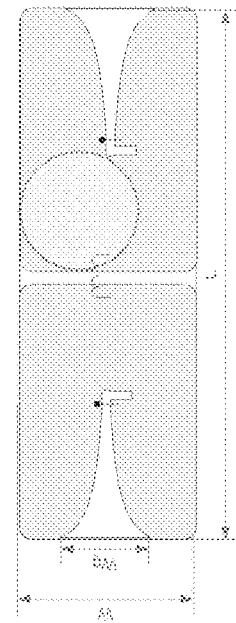

FIGS. 14A, 14B, 14C show an embodiment with a planar structure with multiple antennas operating on different frequencies (annotation numerals described in US pre-grant patent publication no. 2012/0169543, incorporated herein by reference), that some embodiments of the present disclosure can use to realize an E-key with transceiver(s) and RF energy harvesting circuit(s) operating on different frequencies/bands. One can also adapt this teaching to semi-planar structures including a credit card shaped structure that is thin, rigid and flexible.

Figure 8:
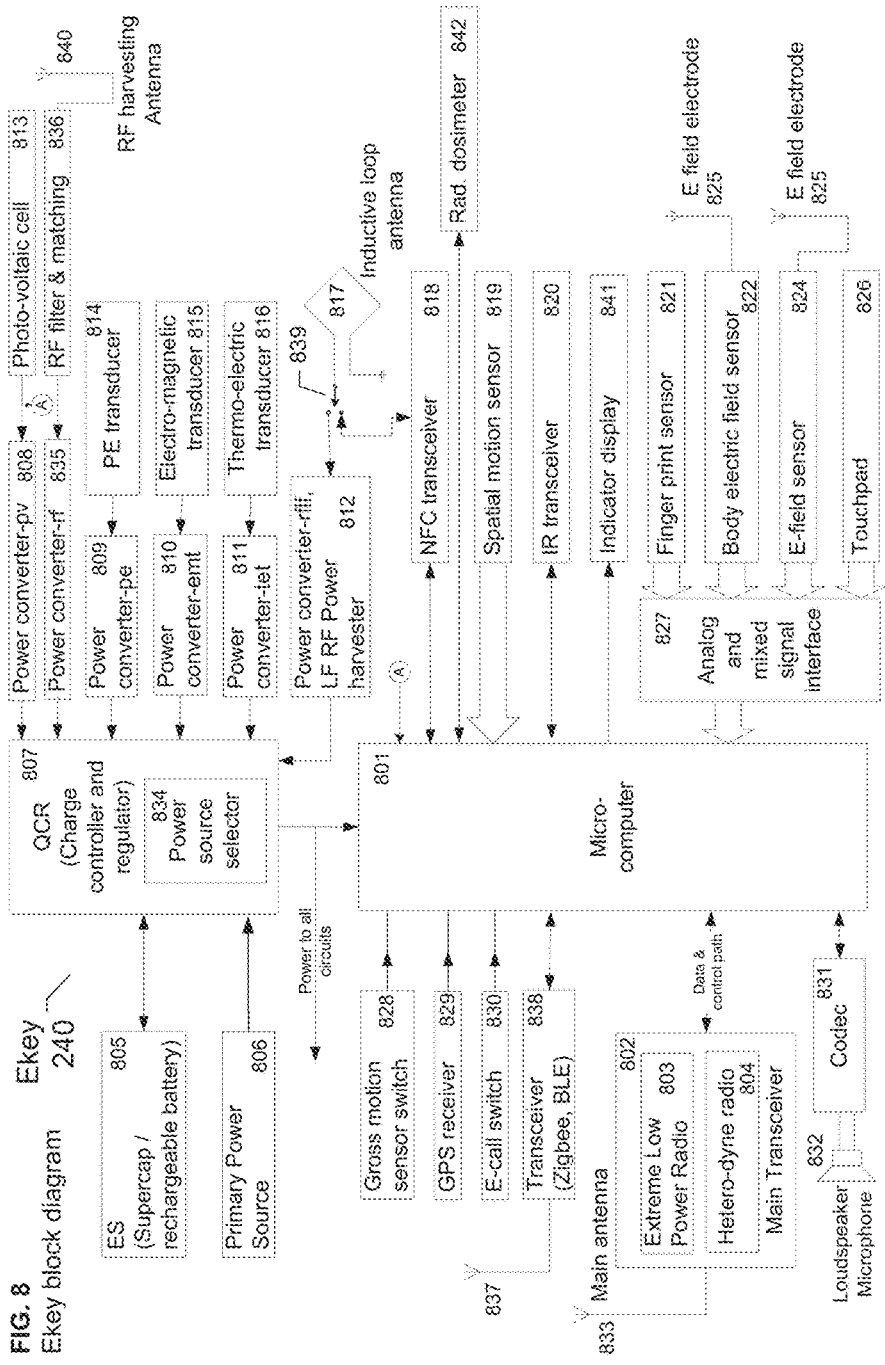
FIG. 8 shows the electronic block diagram of the Ekey.

FIG. 8 depicts an embodiment 240 of the present disclosure.

Micro-computer 801 is an energy efficient variant known to those skilled in the art that has a CPU, memory (volatile and/or non-volatile), various types of Input/output peripherals and runs a program to perform computations, respond to events and coordinate various electronic circuits.

Main transceiver 802 provides primary RF communication with other devices (Non limiting examples are router 250, door-lock 210, locator 260, and tracker 260). The use of the license free ISM frequency band is desirable because of popularity, cost, interoperability and parts availability. Amongst others classical transceivers based on the use of a local oscillator and the heterodyning principle and/or digital radios could be used using various kinds of modulations and protocols. UWB (Ultra-wide-band) radios could also be used. Specialized multi-tiered radio systems like those disclosed in US 20100040120 Low power radio communication system could also be used that have a Tier-1 Extreme Low Power Radio 803 (that does not use a RF local Oscillator) and a Tier-2 radio 804 that may use a classical heterodyne based radio. The Main Transceiver 802 is connected to Main Antenna 833.

A previously disclosed SecureALL UKey (UKN Model) includes the following elements of the FIG. 8 block diagram:
 a) Micro computer 801
 b) Main transceiver 802, comprising
   a. Main antenna 833
   b. Tier-1 Extreme Low Power Radio 803, and Tier-2 Heterodyne radio 804.
   c. A secondary antenna (not shown in this block diagram)
 c) Primary power source (PPS) 806
 d) Energy Store (ES) 805
 e) A rudimentary power regulator connecting the PPS and ES to electronic load (Not shown in this block diagram)

Some embodiments of the present invention also include such elements but they are not necessarily identical to such elements in the UKN model. Ekey 240 may include such elements (which may or may not be identical to those of the UKN model) and may further include more transceivers to allow communication with various other systems. Transceiver 838 provides the ability to communicate with other devices using a different set of frequency, modulation or protocol. (e.g. IEEE802.15.4, Zigbee, Bluetooth Classic, Bluetooth Low Energy or Bluetooth High Speed). This could enable secondary authentication of the Ekey's owner with the owner's Smartphone or other items that may have a compatible transceiver and protocol. Transceiver 838 may share antenna 833 with the main transceiver 802 or have a separate antenna 837. A NFC (Near Field Communication) or RFID transceiver 818 may also be present to allow communication transactions with compatible devices in proximity. Typically they operate at frequencies of 13.56 MHz and 125 KHz respectively, and use inductive loop antenna 817 using magnetic field coupling. The inductive loop antenna 817 could also be used for non-galvanic charging when the device is placed in close proximity to a charging station that generates appreciable short range magnetic coupling to transfer a few watts of charging power. The system switches (using switch 839) the inductive loop antenna 817 between the NFC transceiver 818 and the Inductive power harvester 812 depending on use case, via sensor input and/or periodic checking of the signal on inductive loop antenna 817.

Similar to transceiver 838 the Ekey may further comprise more transceivers to allow communication with various other systems. Transceiver 820 provides the ability to communicate with other devices using optical radiation. Amongst other uses this could allow the Ekey user to send IR (Infra Red) beam based commands to a home entertainment system.

Energy Harvesting

ES 805 stores energy from various energy harvesting sources. ES 805 could be realized by many means including but not limited to electronic components such as capacitor, supercapacitor, and rechargeable lithium-ion cell. In some embodiments ES can be implemented by employing both Supercapacitor and rechargeable cell. In some embodiments it is configured to work with Primary power source (PPS) 806 to increase the ability to handle short term higher power demand (compared to peak power capability of individual ES 805 or PPS 806).

PPS 806 provides electric power when electric power from harvested energy source(s) and/or ES is inadequate to meet the instantaneous electrical power demand. In an embodiment it is a non-rechargeable battery. In another embodiment it could be a rechargeable battery with low self discharge rate.

Some embodiments of the present disclosure harvest energy from the environment to partially or fully provide operating power to the Ekey. Energy could be harvested from one or more sources from a group comprising:
a) Photo voltaic cell
b) Radio Frequency antenna
c) Inductive field antenna
c) Mechanical vibration or stress
c) Thermo-electric transducer Energy available from various energy harvesting devices (EHVD) is accepted by Charge controller and regulator (QCR) 807 that uses it to charge an energy storing device (ES) 805 and/or supply full or part of the operating power load of the Ekey/appliance. In a preferred embodiment ES is implemented using a Supercapacitor. QCR 807 circuits can be implemented by a variety of electronic methods known to those skilled in the art.

Power source selector 834 provides the function of selecting one or more available energy sources to meet temporal power load.

Figure 12:
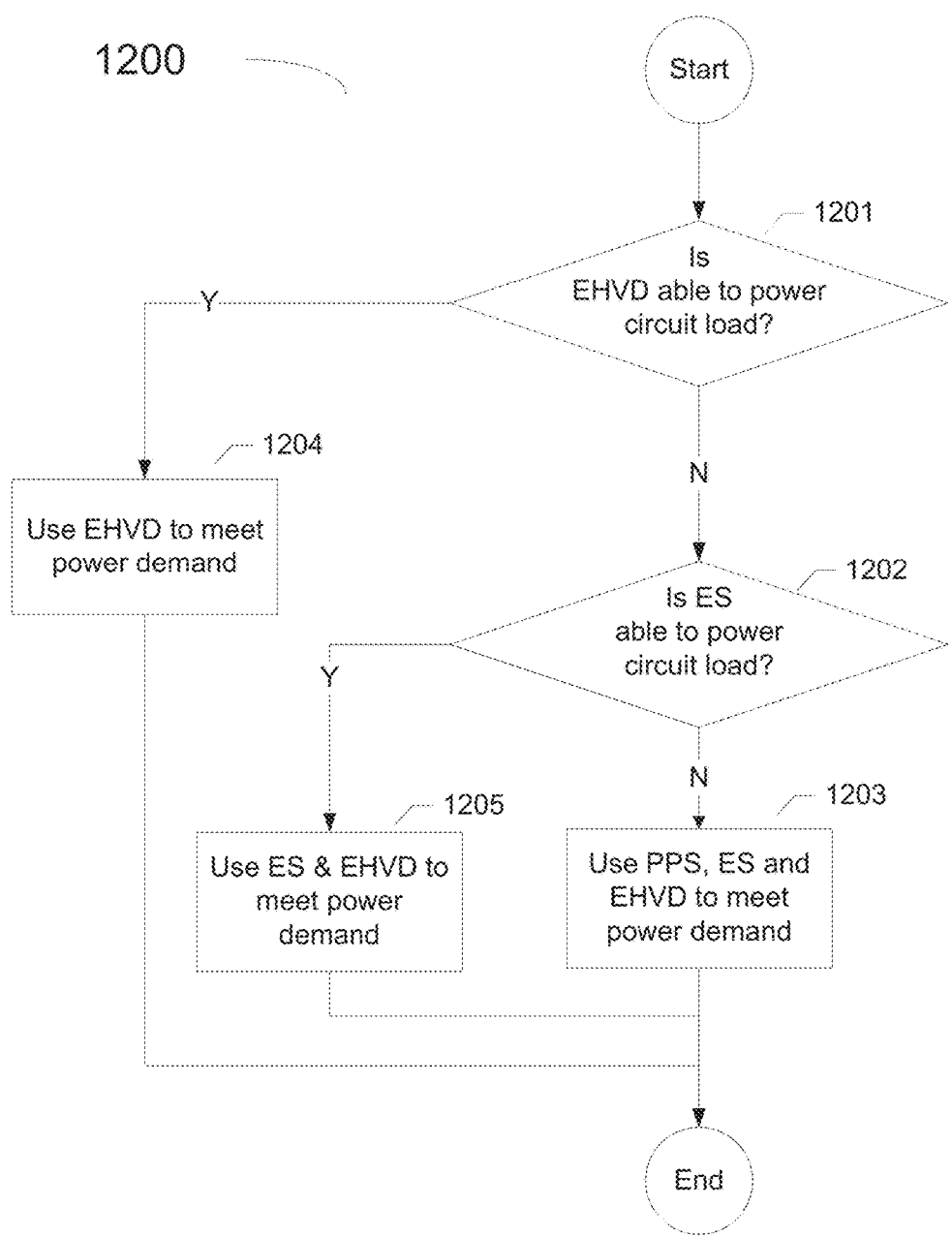
FIG. 12 shows an exemplary flow chart logic for energy source selection

FIG. 12 shows an exemplary flow chart logic 1200 that is evaluated by PPS 834 periodically and/or when the operating state of the Ekey or EHVD changes. The flowchart element 1201 first evaluates if the available power from all EVHD sources is enough to meet the temporal power load demand of the operative circuit (all circuit of the Ekey/appliance except the power circuit responsible for power generation, conditioning, regulation and distribution), in which case 1204 it conveys and convert EHVD power to a voltage level suitable to power the operative circuit. Else it determines 1202 if the available power from all EVHD sources and ES 805 is enough to meet the temporal power load demand of the operative circuit in which case 1205 it combines power from EHVDs and ES 805 and convert it to a voltage level suitable to power the operative circuit. Else 1203 it combines power available from PPS 806, EHVDs and ES 805 and converts it to a voltage level suitable to power the operative circuit. In an embodiment, operation 1205 uses power from only ES 805. In another embodiment, operation 1203 combines power available from PPS 806 and ES 805. And in yet another embodiment 1203 uses power from only PPS 806.

Photovoltaic (PV) array 813 generates electric power when light falls on it. The power converter (PC-pv) 808 efficiently converts the energy to a voltage level (3V typical) that the Charge controller and regulator (QCR) 807 can employ to power the Ekey. An exemplary block diagram in FIG. 11A shows an embodiment where sufficient power generated by PV array EHVD is detected by a threshold comparator 1104 that turns on converter controller 1105 and signals it to convert the input power to a voltage level suitable for QCR 807. In this example QCR 807 provides a path to connect the PC-pv 808 output to the ES 805. Capacitor 1103 is the typical input capacitance required for proper operation of power converter 1102.

FIG. 11C shows a method where QCR 807 allows power controllers from various EHVDs to directly transfer energy to ES 805. One or more load power converter 1111 is employed to convert energy from ES 805 and/or PPS 806 to a suitable voltage level to meet the load needs of the Ekey's operative circuit.

In an embodiment ES 805 is realized by a rechargeable cell whose operating voltage range is close to the PPS's 806 nominal output voltage, enabling the use of a simpler and more power efficient load power converter 1111.

In a preferred embodiment Supercapacitor is used to realize ES 805 and the power output from PC-pv (or PV-rf, PC-pzt, PC-emt, PC-tet etc.) is used to transfer charge to raise ES 805's voltage. (I.e. No effort is made to regulate the voltage across ES 805, instead it is allowed to vary from zero to its maximum rated operating voltage) and QCR 807's load power converter 1111 is used to convert a widely varying input voltage from ES 805 to a regulated output voltage. This arrangement allows optimal use of the supercapacitor's energy storage capacity. Contrast this with prior art conventional designs that use a supercapacitor for energy storage but limit its operating voltage to operative circuit's minimum and maximum operating voltage that is typically ±20% of the integrated circuits nominal supply voltage (this is when the supercapacitor is tied to Vdd power plane that powers all ICs). As an example, if the CPU and transceiver IC operate at 1.8V nominal and the Supercapacitor is rated for 3.0V. The total energy stored in a capacity is given by the equation $E=0.5*Capacity*V^2$/(where E–stored energy, V–capacitor's terminal voltage, C–capacitors capacity). Thus the conventional design only uses the energy capacity difference between Vmin (in this case 1.44v) and Vmax (in this case 2.16v); Thus conventional capacity $Ec=0.5*Capacity*2.59$ (as $2.16^2-1.44^2=2.59$), where as the proposed embodiment using voltage range of 0.3V to 3.0 yields a capacity of $Ei=0.5*Capacity*8.9$ (because $3.0^2-0.3^2=8.9$), that is 343% of the conventional capacity.

In another embodiment the PC-pv 808 is designed to automatically find the maximum available power at given moment (as the power from PV is a functiona of the temporal illumination flux density on its surface, and some other parameters like temperature) and adapt its operating mode to most efficiently convert/transform it to charge the ES 805. In an embodiment optimization is done by a model that use a switching converter's operating mode parameters that are well known to those skilled in the art (E.g. Load line, cycle charge, cycle energy, Buck/boost-period, -duty cycle, peak current, etc)

The present disclosure further teaches energy harvesting from ambient radio-frequency (RF) field that could be used by Ekey 240 that has extremely low average operating power. For example SecueALL's Extreme Low Power based Radio transceiver (2.45 GHz ISM band) that is always operating while consuming only 10 microWatt power, or radios using heterodyne based transceivers operating at extremely low average duty cycles.

Ekey 240 can be designed with a wideband antenna, or multiple antennas that open doors to operating off energetic RF power density in ambient environment for a large fraction of the operating time, thus reducing battery size and/or considerably increasing battery life.

For example the small (33×65×13 mm size) SecureALL's Ukey already employs a wideband isotropic antenna (500 MHz bandwidth at center frequency of 2.44 GHz) that operates well with linear and circularly polarization RF power source. The antenna of a 2.4 GHz based Ekey/Ukey worn by a user who is using a hand held device (like laptop, tablet-PC, smart-phone etc.) will experience a strong 2.4 GHz band RF field. Such handheld devices periodically transmit +15 to +30 dBm power. Since the distance is at less than 1 m the FSPL (Free Space Propagation Loss) is only about −34 dB, thus the Ekey's isotropic antenna will receive −6 to 21 dBm power (I.e. 250 μW to 10 μW power, which is considerably much more than prior art) which can be harvested and used to supplement device operating at 10 μWatt. It is important to note that the Ekey's physical size 33×65×13 mm make for a very small antenna aperture, yet using this scheme at 2.4 GHz it could harvest so much RF energy from other hand held wireless devices that it can provide a substantial portion of the average power need of the Ekey. Similarly a 2.4 GHz WiFi router being used to stream video content transmitting at +30 dBm at 10 ft (FSPL=−50 dB) distance will provide −20 dBm (10 uW) power. The 5 GHz ISM band in USA permits use of even higher radiation levels, thus allowing some embodiments of this invention to harvest even more power from devices using WiFi or other appliances commonly found at home, offices and civic places.

The 200 MHz frequency band below and 200 MHz band above the 2.4 GHz ISM band is a heavily used licensed band, used by commercial users including mobile phone service providers. A wideband antenna can thus additionally capture and harvest energy from nearby phone towers and people using cell phones. Cell phones could transmit as much as +36 dBm power (4 Watt) that is many times more than WiFi routers, thus the living environment is a rich source of ambient RF power intensity. The 5 GHz ISM band is even wider than the 2.4 GHZ ISM band thus will permit even richer RF channels, devices and transmitter population. Wideband energy harvesting as taught in this disclosure becomes even more compelling because realization of Ekey 240 antenna with wider bandwidth becomes easier (as one skilled in the art of RF antenna knows that when thickness and size of the antenna radiating element becomes comparable to the wavelength the bandwidth as a fraction of the center frequency increases and the "Antenna Q" decreases).

Ekey 240 using wideband antennas, and/or multiple antennas can leverage RF energy harvesting. Such antennas are taught in SecureALL patent US20120169543 and used in SecureALLs Ukey/Ekey. See FIGS. 1, 13A, 13B, 13C, 13D, 14A, 14B, 14C.

In an embodiment Ekey 240 has a separate antenna 833 dedicated to the main transceiver, and a separate RF harvesting antenna 840 (generally operating on a different frequency) connected to a suitable RF filter and matching circuit 836 to transform the RF impedance suitable for RF energy rectification into DC power by power converter-rf 835.

Figure 9A:
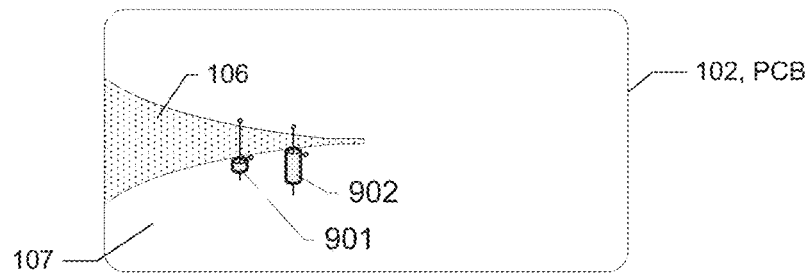
FIG. 9A shows an example of multiple feed points on an antenna.
Figure 9B:
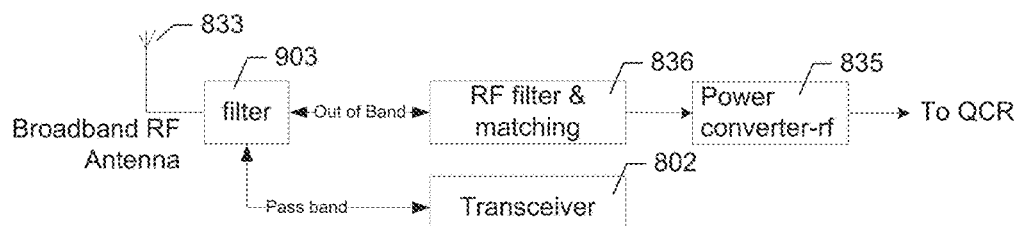
FIGS. 9B, 9C, 9D shows methods to connect various elements of electronic function block for RF energy harvesting.

FIG. 9B shows an embodiment to harvest energy using a broadband antenna that is also used by the main transceiver 802. The main transceiver has access to the main antenna 833 via a filter 903 that implements a band pass filter function to allow exclusive access to the frequency band of interest to the main transceiver 802. The RF filter and matching 836 for energy harvesting circuit also has access to the main antenna 833 via the filter 903 that implements a band pass filter function on a separate port that allows exclusive access to the frequency band of interest to the RF energy harvesting circuit.

Figure 9C:
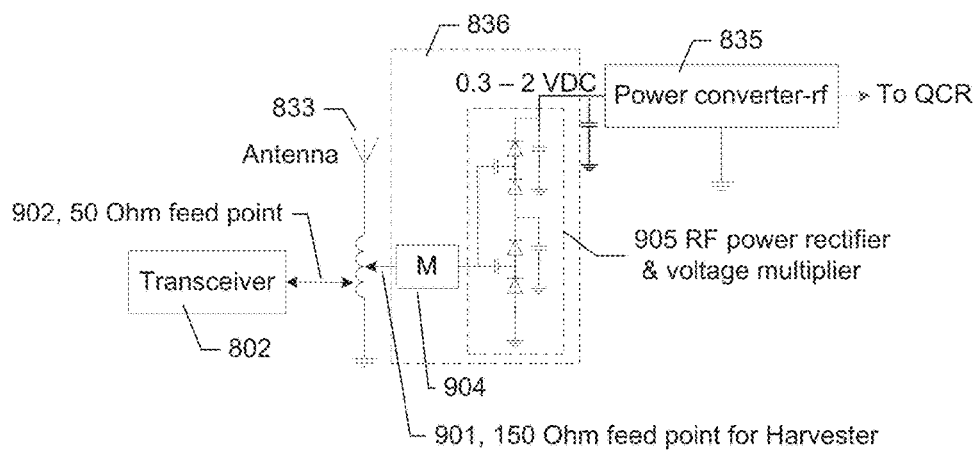

FIG. 9C shows another embodiment to harvest energy using a common antenna. Both main transceiver 802 and RF filter and matching 836 for energy harvesting are connected to the antenna. In a preferable embodiment the main transceiver 802 is connected to a feed point 902 whose feed point impedance matches the transceiver's electronics (typically 50 ohm), and RF filter and matching 836 for energy harvesting is connected to a feed point 901 whose feed point impedance matches its electronics (typically an impedance much higher than 50 ohm to make available higher RF voltage that can later be easily rectified by a RF diode). RF filter and matching 836 comprise a RF matching and isolation circuit 904 that feeds the RF energy to a RF rectifier and voltage multiplier 905, which in turn generates a DC output voltage; when signal is too weak the diodes (in RF rectifier and voltage multiplier 905) are in high impedance state and the circuit 836 does not load the antenna feed point 901. Power converter-rf 835 is similar to PC-pv 808, comprising a suitable power converter 1102 and controller 1105. Most of the time the main transceiver 802 is in receive mode where the expected signal is −50 to −100 dBm, a level too weak for the energy harvesting circuit to operate. When the antenna 833 receives a strong signal that is useful for energy harvesting (say −5 to −15 dBm) the RF filter and matching 836 for energy harvesting will start operating and absorb incident power (In some embodiment the main transceiver 802 could optionally be designed with an attenuator switch that RF filter and matching 836 can activate to reduce antenna loading by the main transceiver 802, thus allowing maximum energy harvesting). The transceiver continues to get access to the incident signal, albeit somewhat attenuated due to energy absorption by 836 (which in most cases is beneficial helping the Automatic Gain Control AGC function). When the main transceiver 802 needs to transmit, the RF matching and isolation circuit 904 is switched to isolation state to ensure transmitted power is fully available for antenna radiation. This simpler method could also be used in application where the main antenna 833 is a broadband antenna, allowing energy harvesting across the whole antenna bandwidth and the main transceiver 802 to operate normally in the intended narrower band. In some embodiment the main transceiver 802 may have a filter to prevent unwanted signals from saturating the RF front end electronics.

FIG. 9A shows an embodiment Ekey 240 with feed point 902 to connect to main transceiver 802, and a higher impendence feed point 901 to connect to the RF energy harvester circuit.

Ekey 240 can also harvest RF energy from the environment by using the RF energy impinging on inductive loop antenna 817 via Power Converter-rflf 812 that has the necessary frequency tuning, scanning, impedance matching and RF power rectification circuit. It harvests ambient RF energy for example as a users walks by NFC security readers in super-stores entrance, RFID readers, or a local radio/TV broadcast transmitter.

An embodiment of the RF harvesting system periodically sweeps the RF energy harvesting band to seek out the most energetic operating frequency and optimize the circuit for optimal performance (E.g. tuning elements and/or impedance matching circuit). This is particularly useful for energy harvesting circuit elements in 836, 812 that have narrower bandwidth than the antenna it is connected to. It is also useful for situation when the antenna is small compared to operating wavelength, and for better performance it needs to be tuned to a specific frequency, and the tuning range spans a wider band. E.g. Ekey wanting to harvest energy from LF, MF, VHF, and UHF band sources. As scanning operation itself consumes energy, a further embodiment of the disclosure has the RF harvesting system periodically scan the RF energy harvesting band to seek out the best operating frequency suitable for energy harvesting, failing which it uses a back-off algorithm to reduce the scanning period and conserve energy. This back off algorithm further could modify the behavior taking into consideration instantaneous energy available from other EHVD sources. Thus if PV array 813 is currently generating 1-mW energy it doesn't help much to bother harvesting 20 μW from RF sources.

In some embodiments, an EHVD uses Thermoelectric transducer 816. Power converter-tet 811 conditions and converts the harvested power suitable to be accepted by QCR 807.

An embodiment of this teaches an EHVD that uses electro-magnetic transducer 815. One embodiment is shown in FIGS. 5 and 6. (A non-limiting example is a coil in a magnetic field loaded with a mass that vibrates and generated EMF as a person wearing Ekey moves about during daily activity, a dynamic loudspeaker). Power converter-emt 810 conditions and converts the harvested power suitable to be accepted by QCR 807.

An embodiment of this teaches an EHVD that uses Piezoelectric and/or electrostrictive (PE) transducer 814 mounted in the Ekey that generates EMF due to strain by a person wearing the Ekey moving about during daily activity. Power converter-pe 809 conditions and converts the harvested power suitable to be accepted by QCR 807.

When the Ekey 240 suitably housing a PE transducer 814 is put in a wallet which is further put into a person's back pocket while sitting or driving a car generates significant stress that the transducer easily converts into high voltage electric output. In this type of usage as most of the flexing happens along the length of the Ekey. An embodiment of the present invention is to orient the PE EHVD along the length of the thin Ekey device (see 814 orientation in FIGS. 5B, 6B), as in normal use the bending strain would be larger compared to the width of the thin Ekey device. Further, for longevity, the electrostrictive elastomer membrane should be pre-stressed along the direction of the strain as any compressive stress in the planar directions will lead to the formation of wrinkles, which may disrupt the function of the transducer. Providing for multiple PE EHVDs allows redundancy, power scalability and layout options to focus on an area that sees compatible range of strain with respect to efficiency and maximum strain specification.

Unlike prior art (E.g. U.S. Pat. No. 6,433,465 or conventional Piezo transducer harvesters) this disclosure teaches not only harvesting energy due to high stress (that generates high enough voltage to directly charge a battery), but also harvesting energy due to lower stress (E.g. stress level that produce ~1 volt EMF) as shown in FIG. 11B.

The output from PE EHVD 814 is often low frequency (E.g. 0.1-10 Hz) that use of transformer to step up the voltage before the energy can be harvested becomes impractical due to size and cost.

FIG. 11B shows a PE harvester 814 and power converter 809. It accepts input voltage from PE EHVD 814 and if the signal is strong (E.g. >2 volt) it routes it to QCR 807 by using a diode 1105 (to explain the concept only one diode is shown, however it is not limiting to that but one can use other circuits like a bridge rectifier etc.). However when the voltage input is not strong enough, the input is sensed by power level sensor 1110, and rectified by an active bridge 1112 using MOSFET switches. The slowly varying input voltage waveform is converted to higher output voltage across output capacitor 1109 by either:

a) Converting the input power to high frequency (say 200 KHz) AC by using a chopper switch 1106 and then stepping up the voltage by a small size high frequency transformer 1107 followed by a rectifier 1108. One could also use a voltage multiplier circuit for stepping up.

b) Alternatively one can use a boost switching converter

Figure 9D:
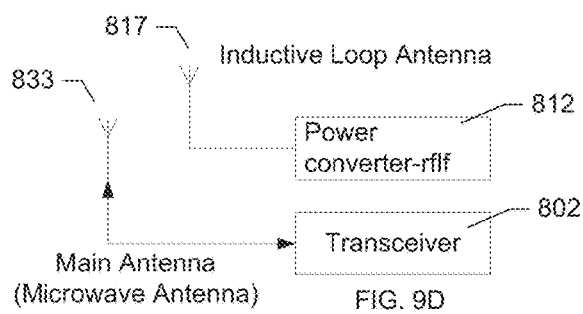
Figure 9E:
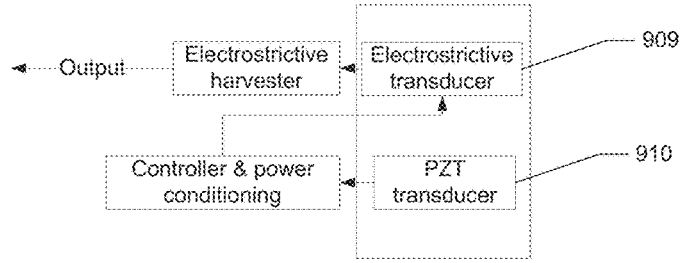
FIGS. 9E, 9F, 9G shows methods to mount energy harvesting mechanical transducers on a badge style Ekey, and corresponding electronic function blocks.
Figure 9F:
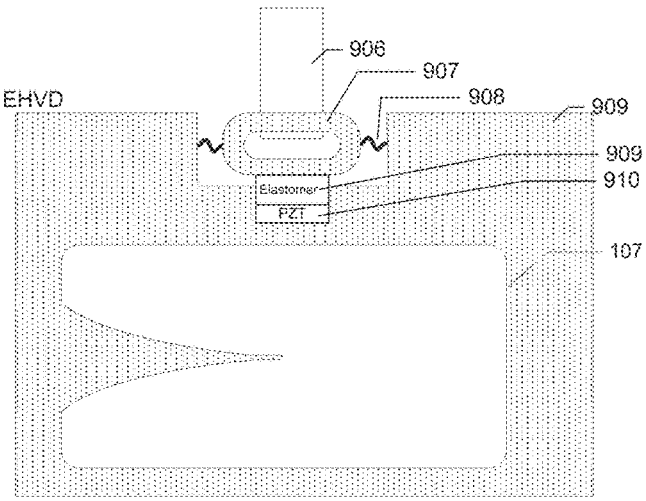

FIG. 9F shows a way to harvest energy for using PE EHVD transducer. The Ekey 240 in the form of a badge hangs off a means to clip a badge hook clip 906 affixed to apparel worn by a person that connects to a badge hook 907. The badge can be configured to be worn in portrait or landscape orientation; or any other orientation. The badge hook 907 is connected to a PE element comprising an electrostrictive Elastomer 909 connected in series with a Piezo-electric transducer 910 (meaning the weight force is serially transferred from Piezo element to the electrostrictive elastomer), which in turn is mechanically affixed to badge body 909. The weight of the badge is bourn though the badge hook going to the Elastomer element 909 and Pzt element 910. As a person wearing the badge walks, her gait introduces a vertical oscillatory motion, straining the electrostrictive elastomer element 909 and Pzt element 910 generating electrical power. FIG. 9E shows a block diagram arrangement of using high voltage from Pzt to bias the electrostrictive Elastomers element with necessary high voltage so that it can generate the maximum harvested energy. It should be noted that one could also use some embodiments of this invention by using only one class of transducers like PZT or electrostrictive Elastomer based transducers and other transducers based on intrinsic material property that convert mechanical stress to electricity.

Figure 9G:
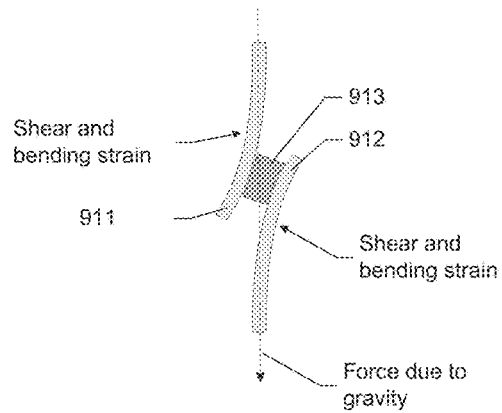

FIG. 9G shows another scheme of arranging the transducer to harvest mechanical energy that is particularly advantageous for thin profile and uses cheaper to fabricate thin sheets of PE EHVD. Here the force due to the weight of the badge generates shear and bending strain on the PE EHVD. The top member 911 is connected to the badge hook 907, while bottom member 912 is connected to badge body 909. The top member and bottom member are bound together with an interface 913. The desired range of strain on the top 911 and bottom member 912 is adjusted by choosing an appropriate thickness of the interface 913. One could choose to use PZT for both the top and bottom member. In an embodiment one of the strained members (911 or 912) is a Piezo-electric transducer and the other member is an electrostrictive transducer. The 913 interface could be made of compliant material to provide strain to be spread out over a larger area on the top and bottom members, thus improving reliability and robustness. In another embodiment the interface 913 could have the PE EHVD mounted on its two faces that touch top 911 and bottom 912 member respectively. This allows easy wiring of PE EHVD as well as placement of PE EHVD electronic circuitry in proximity.

The PE transducer 814 could also double up as audio speaker and microphone 832 by switching it to connect to codec 831. An embodiment of the present invention is to use the Piezo-electric EHVD transducer in multiple ways such that it is used as audio speaker, audio microphone as well as shock sensor and energy harvester when the audio function is not in use. The quiescent mode is to function as energy harvester. To serve as a speaker the Piezo element is switched and connected to be driven by an audio amplifier's output. To serve as microphone its terminals are connected to an amplifier input. When the audio function is not needed it is connected to the energy harvesting circuit. Necessary operating electronics and protection circuits are turned on and off as the usage mode changes; in particular high voltage safety when the Piezo element is in high strain. For clarity the transducer switching circuit is not shown in FIG. 8; one skilled in the art knows various ways to switch the transducer to various electronic circuits' port. Similarly Electrostrictive transducer can be alternatively used as energy harvester and audio speaker/microphone. This saves space and cost. Another embodiment is to use in a series arrangement the Piezo-electric and Electrostrictive transducer (similar to FIG. 9D arrangement) where they are sandwiched together and work in unison to function as microphone, audio speaker, energy harvester or shock sensor.

In some embodiments a combination of various power control functions (834, 807, 808, 835, 836, 809, 810, 811 and 812) could be merged into a common function block for better performance and cost optimization.

Sensors and Others

In an embodiment the Ekey 240 comprises sensors that measure various environmental parameters and user inputs. A user can press the Ecall switch 830 that signals to the micro-computer 801 various user commands (E.g. Emergency/distress call, Lockdown command to nearby door(s) etc).

Gross motion sensor switch 828 sends a digital signal pattern to the microcomputer 801 when the Ekey 240 is mechanically moved. The signal could then be used by Ekey 240 to operate other electronic sensors (E.g. Spatial motion sensor 819, E-field sensor 824 etc.) or functions (E.g. transition for various level of sleep condition or operating mode, etc.). Representative non limiting examples of Gross motion switch 828 are: mercury switch, mechanical vibration switch using a metal ball or spring mass that roll on to nearby electrical contacts when disturbed (E.g. SENSO-LUTE GmbH part #'MVS0608.02'—Micro vibration sensor) and Piezo sensor. Also some types of accelerometers have low enough operating power to act as gross motion sensor without significantly impacting quiescent operating power of the multi-function Ekey.

The spatial motion sensor 819 comprises
a) accelerometers
b) rate gyro sensors
c) magnetic compass When powered by microcomputer 801 the accelerometer and rate-gyro provide linear and angular acceleration measurement to the microcomputer 801 respectively. That information is integrated to obtain change of velocity, and then integrated again to obtain displacement. When three axis accelerometer and rate-gyros are used, Ekey 240 can establish initial inertial reference frame upon power up and thereafter accurately measure spatial motion. Three axis accelerometers allow determination of local horizon and magnetic compass provides angular position of north direction allowing quick establishment of absolute orientation of the Ekey. Even if a magnetic compass is not present spatial motion can be determined assuming an arbitrary initial azimuthal orientation. A somewhat less accurate spatial position can be determined by only using accelerometers.

In an embodiment Spatial sensor 819 allows Ekey 240 to sense user gestures as the user manipulates her hand while holding the Ekey, or manipulates the Ekey 240 by hand or other means. Sharp gesture can be easily determined (E.g. vertical tapping of Ekey 240 on wall or table top, flat orientation tapping, rotational flip etc.) along with the intensity of the gesture.

In another embodiment Spatial sensor 819 can also measure subtle user body movement when a user is wearing the Ekey. It allows easy measurement of user's physical activity level, mobility and as well as immobility. Reliability is further increased when Ekey 240 can determine that the user is indeed wearing Ekey 240 by using the information from body electric field sensor 822 (that in turn uses E-field sensor electrode 825) (providing capacitance information due to skin proximity) and E-field perturbation.

In an embodiment the ambient light intensity is sensed by measuring the current generated by the photo voltaic cell 813 (FIG. 8). In embodiments that comprise separate PC cells on each sides of the Ekey device, the relative light intensity from the separate PV cells is used to determine which side is exposed to the environment and which side is facing the skin/body of the person wearing the UKey. Some embodiment could use a dedicated photo cell for light measurement instead of using PV used for EHVD, yet in another embodiment the IR transceiver's 820 optical sensor is used to get a measure of ambient light. The ambient light sensor could be used to obtain information as to amount of time a person has been exposed to sunlight (health care aspect), daytime spent outdoors, physical activity, when the Ekey was removed from a wallet and worn (and later put back into the wallet), time (and duration) when wearer got up from bed at night.

In an embodiment the Ekey monitors user activity in an old age home to ensure and the user has not suddenly gone inactive/incapacitated due to a medical issue. The Ekey can be programmed to generate an inactivity alarm message based on criterions derived from sensor information coming from Accelerometers, rate gyros, Gross motion sensor switch 828 and E-field sensors. The criterion comprising some or all of the following: a) A user is wearing the Ekey device b) sudden stoppage of a user's activity as seen from drop of dynamic signal from accelerometer, rate gyro, mechanical motion switch, ambient light sensor and E-field sensors c) the user's activity not matching the user's daily activity pattern d) sudden stopping of activity preceded by strong dynamic signal that is generally associated with fall, d) Lack of activity for a period exceeding a user-defined limit.

In an embodiment E-field Sensor 824 measures the electric field generated by an intentional (external) electric field generator, the environment as well as the perturbation caused by movement of people and things. It measures the electric field by measuring the voltage on E-field electrode(s) 825 in single ended or differential mode. In some embodiments it demodulates and recovers the data transmitted by an intentional electric field generator. In some embodiments the center frequency and bandwidth of the E-field Sensor 824 is dynamically changed per data communication protocol. In yet another embodiment the E-field sensor may comprise many detectors measuring electric field intensity at specific frequencies. The E-field sensor interfaces with analog and mixed signal interface block 827, provides suitable interface to micro-computer 801. In some embodiments, the analog and mixed signal interface block's 827 functionality may be subsumed by the microcomputer 801 or the sensor 824, obviating its need.

In an embodiment, Body E-field sensor 822 is similar to E-field sensor 824, except that it operates at a much lower frequency band (typically few Hz to few KHz) such that it can capture the electric field generated by biological aspects of human body (E.g. nerves, muscles, tissues) as well as electric field perturbation caused by the human body. It measures electric field by measuring the voltage on E-field electrode(s) 825 in single ended or differential mode. In another embodiment the center frequency and bandwidth of the E-field Sensor 824 is dynamically changed to tune into dominant ambient radiation (E.g. from mains power line, VLF, ULF, SLF, ELF radio transmitters) so that contributory change due to physical changes in nearby environment can be measured. In an embodiment it can also measure the capacitance perturbation due to body skin and estimate electrode's 825 distance from the skin. A method to measure capacitance is where one of the electrodes is used to generate an electric field stimulus and the response on the E-field electrode is used to determine the capacitance and capacitance dissipation factor. Dissipation factor is an important parameter that allows distinguishing the proximate material is biological tissue or in-animate physical parts (E.g. metal pieces).

In some embodiments E-field sensor 824 and Body E-field sensor 822 may use common circuit elements and e-field electrodes.

Another embodiment Ekey 240 comprises a GPS receiver 829 (with integrated GPS antenna) that can be turned on by the microcomputer to provide its GPS position. This function allows Ekey 240 to provide this information when requested by the application software server or when Locator (e.g. tracker) asks for positioning information.

Another embodiment of Ekey 240 provides audio communication capability to the user by employing Codec (Coder Decoder) 831 to provide audio compression and a loudspeaker 832 that could also serve as microphone in half duplex operating mode. Thus Ekey could
 a) announce messages to the user based on commands from the application software server,
 b) allow a remote person using the application software server to speak the user
 c) Allow two-way communication between the Ekey user and a remote person that is using the application software server.

In some embodiments Loudspeaker/Microphone 832 function and PE transducer 814 function could be merged by using a shared PE transducer that can be switched between the two functions depending on need.

Another embodiment of Ekey 240 comprises a finger print sensor 821 so that when needed the microcomputer can read and verify finger print of an authorized user. This additional authentication increases system integrity, so that if a person other than the intended Ekey user tries to use the Ekey obtained by error or fraud, the Ekey 240 can be made to operate in a mode different from normal operating mode for an authorized user.

In addition to the user interaction with Ekey 240 using Ecall switch 830, an embodiment of Ekey 240 may further comprise a touchpad 826 allowing availability of many more keys/buttons towards greater ease of use and functionality.

Access Control System

Figure 2:
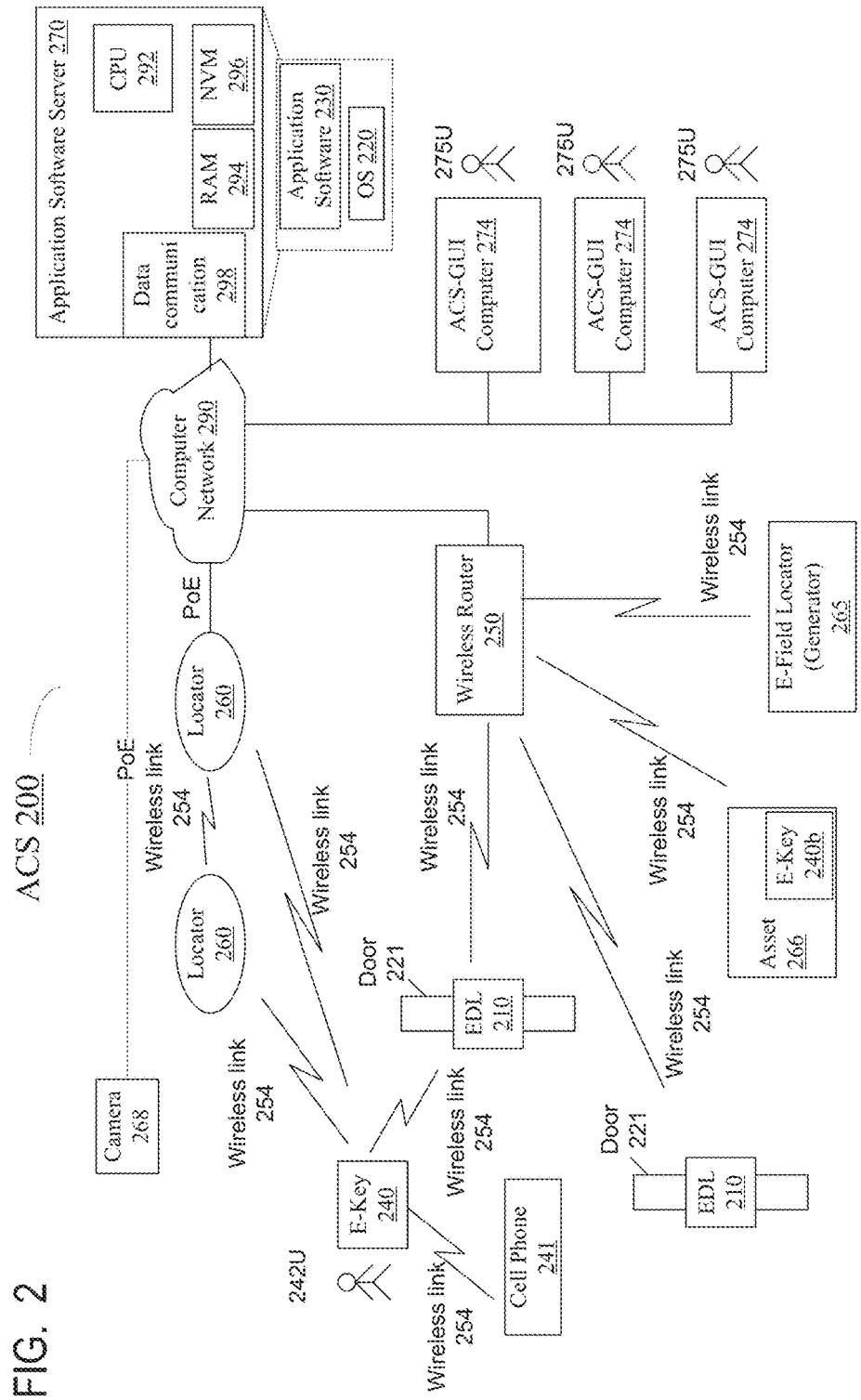
FIG. 2 shows an embodiment system block diagram of Access Control System of the present disclosure.

FIG. 2 shows an exemplary Access Control System 200 in the context of which the Ekey 240 may be used. Access Control System name is typical name but the system could perform many other functions (non-limiting examples like security system, tracking, activity management, public announcement, emergency management, emergency marshalling area auditing, wandering protection in senior care, patient monitoring, asset tracking, etc. apart from just traditional Access Control functionalities). The Application Software Server (AS) 270 can be a typical server computer with CPU (292), volatile and non-volatile memory (294, 296) and data communication devices such as network cards (298). The Application Software Server (AS) 270 also runs an operating system 220 and on top of that the Application Software 230.

The ASS 270 is connected over computer network 290 to the other components of the system. Connected to this network are client application GUI computers 274 that can be used by users 275U to monitor and configure the system, such as to define access rights to doors, to query the state of the system, use and control devices connected via a communication interface or to get notified about exceptions and alarms. The connection could be wired or wireless.

Also connected to the computer network 290 are one or more of the following:
 a) Locator devices 260, used to determine the location of Ekeys 240,
 b) Wireless routers 250, a type of locator device that also provide wireless connectivity to various other components of the system, such as EDL 210 and Ekeys 240.
 c) Camera (Video or still) 268 that can capture optical images depending on configuration or command from ASS 270. The camera may additionally comprise mechanical actuators to change to desired spatial orientation the camera's field of view.

Locator 260 devices discover Ekeys that are within communication range and determine its gross location based on signal strength or ToF. In some embodiment a Locator also takes on the function of a Wireless Router 250.

Tracker 1002 (described later in this disclosure) is a specialized locator 260 that provides distance and azimuth information about the Ekey location.

Electronic door locks (EDLs) 210 are mounted on doors 211 and are configured to unlock the door when an Ekey 240 carried by an authorized user 242U is within a configurable range. EDL 210 is connected over a wireless link 254 to routers. Over this link the EDLs 210 can receive access control information and other commands from the ASS 270 or report events to the ASS 270. In another embodiment EDL 210 also implements the functionality of a locator 260. A UKey communicates with the AS via wireless network 254 connection with the wireless router 250 or locator 260. Server to device (device meaning UKey, EDL, Wireless router, Locator etc.) communication is encrypted.

An EDL 210 periodically scans its environment to find nearby Ekeys 240 and, when found, determines whether the associated user has permission to access the door at the given time.

Some aspects of the disclosure were motivated by authentication problems related to Smartcards, RFID tags and other hardware security tokens (also called identity tokens or hardware tokens or just tokens herein). The disclosure is not limited to such problems however.

For additional security, the user may be required to hold one or more additional tokens at the same time. For example it may be required that the user wear an Ekey 240 in the form of a badge and also carry a second Ekey 240 somewhere else on the body at the same time. This way, if only one of the devices is lost and found by an intruder, the intruder cannot gain access to any protected resources. In one embodiment the Tokens are independent of each other, thus EDL 210 performs check to ensure both tokens have valid access permissions to unlock and present at the same time. In another embodiment the Ekey 240 validates itself by checking that the specific additional token(s) is in communication range.

This concept can be modified to require a first Ekey 240 and a cell phone 241 to be carried by user 242U, whereby the nearby presence of the cell phone 241 is verified by the Ekey 240 using a Bluetooth connection or similar connection, either every time it is used to gain access to a resource, or after a configurable maximum interval since the last verification.

In some embodiments to set up this functionality the Ekey 240 would have to be paired with the cell phone first using a method that is similar to the pairing of a Bluetooth headset; there could however be other methods. One could optionally prevent a rogue who finds a lost Ekey 240 from pairing it with rogue's phone, the association can only be removed remotely by a command from the ASS.

Another method to limit damage with lost or stolen Ekey is to require users to periodically authenticate themselves to the Ekey (for higher security more than one authentication may be called for). This may be required every time a restricted resource is accessed (or operated upon) or in certain configurable time intervals. The Ekey 240 may indicate the need for renewed authentication to the user by flashing an LED (Indicator display 841) or by emitting a sound. Alternatively the EDL could also indicate that access cannot be granted because renewed authentication is required.

Said user authentication can be done in several ways, but is not limited to these methods:
  a. If the Ekey 240 has motion sensing capabilities (spatial motion sensor 819) the authentication can be based in gestures where the user moves the Ekey 240 in certain ways or taps it in a specific timed sequence against a hard surface.
  b. If the Ekey 240 has a key pad (touchpad 826) the user may have to enter a PIN or password.
  c. If the Ekey 240 is paired with a cell phone 241 the user may use an application on the cell phone to authenticate himself using one of many possible authentication methods that are commonly in use on cell phones.
  d. If the Ekey 240 has a microphone 832 the user may have to speak a passphrase that the Ekey 240 compares to a previously recorded voice sample.
  e. If the Ekey 240 has a fingerprint sensor 821 the user may have to scan her finger which the Ekey 240 compares to a previously stored fingerprint.

As mentioned earlier, Ekey 240 may be equipped with an Ecall switch (button) 830 that can be used to send out distress signal messages via wireless network 254. When Ecall is activated by the user, the Ekey 240 makes an attempt to find devices, such as Locators 260, EDLs 210, or Routers 250, that can relay the distress message to the ASS 270. If the Ekey 240 has any location information (for example if it has a built-in GPS receiver 829, or if it is paired with a cell phone 241 with GPS receiver, list of EDLs that most recently communicated with the Ekey) it can include that information in the distress message. After picking up the distress message the Locators 260, EDLs 240, or Routers 250 will send a notification to the ASS 270. The ASS 270 can optionally then instruct Locators 260 in the vicinity of the Ekey 240 to determine the current location and travel direction of the Ekey 240, and then the ASS 270 will notify users 275U whose role is to respond to such Ecalls.

To prevent an accidental transmission of the Ecall due to inadvertent pressing of the Ecall button 830, the user has to the press the Ecall switch 830 in a certain pattern to tell Ekey 240 it is indeed a intentional Ecall initiation (E.g. pressing the Ecall button 5 times within 3 seconds, rapidly pressing the Ecall button 3 times followed by keeping it pressed for at least 3 seconds).

In one embodiment the Access Control System 200 contains cameras 268 and after receiving an Ecall notification with the location of the originating Ekey 240 the ASS 270 can activate the cameras 268 that are in the vicinity of the Ekey 240 and set them to photograph, record or put their live video feed onto the screen of the user 275U who responds to the Ecall.

If an Ekey 240 has voice capabilities the system can establish a direct voice channel between the responder 275U and the user 242U in distress. The voice call can be routed using the existing infrastructure from the client computer 274, via ASS 270, the computer network 290 and a locator 260 or router 250 device to the Ekey 240. Alternatively, a call to the user's cell phone 241 could be placed automatically. In this case the Ekey 240 via its Bluetooth connection could be configured to automatically pick up the call and use its built-in speaker and microphone as a hands-free device.

Alternatively, or if the Ekey 240 is not in range of any device that can relay distress messages, but if the Ekey 240 is paired with a cell phone 241, it can instruct the cell phone 241 to send a text message or email to a preconfigured destination, possibly also including GPS coordinates, or place a phone call where the Ekey 240 can act as a hands-free device.

Recent shootings at school and university campuses have demonstrated the importance of protecting staff and students from harm in the event of a shooter on campus. One component of the protection strategy involves preventing the shooter from entering buildings and rooms that may be populated by potential victims.

A method that is employed in this case is called Lockdown, where entrance through doors is limited to a smaller set of people, such as emergency responders. A shooter, even with an Ekey 240 (or an Ekey 240 obtained under duress from a person with normal access) that would be valid otherwise, would not be able to unlock a door that is in lockdown mode and thus would be obstructed from entering the room full of innocent people.

The Ecall button 830 (or alternately a separate switch button) can be used to send out a "lockdown command" to immediately put in lockdown state a configured set of ELDs 210. When a "lockdown command" is activated by the user the Ekey 240 makes an attempt to find devices, such as Locators 260, EDLs 210, or Routers 250, that can relay the distress message to the ASS 270. If the Ekey 240 has any location information (for example if it has a built-in GPS receiver 839, or if it is paired with a cell phone 241 with GPS receiver, list of EDLs that most recent communicated with the Ekey) it can include that information in the distress message. After picking up the distress message the Locator 260, EDL 210, or Router 250 will send a notification to the ASS 270. The ASS 270 can then instruct EDLs 210 for the configured set of doors to go into "Lockdown" state. ASS 270 will also notify users 275U whose role is to respond to such "lockdown command" events.

To prevent accidental transmission of the "lockdown command" due to inadvertent pressing of the Ecall button 830, the user 242U has to the press the Ecall switch in a certain pattern to tell Ekey 240 it is indeed a intentional "lockdown command" initiation.

E-Field sensing: Unlike magnetic field based near field communication that consumes enormous power and requires a large coil size to generate it, this disclosure teaches using E-field that takes far less power to generate an electric-field, and can be generated by compact electrodes. Part of the Access Control System 200 can be an E-Field Locator (Generator) 265 that generates an alternating E-field (in one or two polarization) to be picked up by nearby Ekeys 240 that are equipped with E-field sensors 824. By modulating the signal, data, such as an ID of the E-Field Locator, can be transmitted to the Ekey 240. To prevent spoofing the E-field Locator 265 may use cryptographic means to broadcast a temporal parameter along with generator ID. In one configuration the Ekey, when first receiving the signature (ID) of on E-Field Locator 265 can attempt to contact a Router 250 or Locator 260 in order to transmit a message with the Ekey's ID and the ID of E-Field Locator 265 to the ASS 270. This system can be used to implement choke points where the presence or passage of Ekeys in a certain location (the location that is covered by the E-field Locator) produces a record of that event. Such a system would be useful in an asset-tracking application where an Ekey (240b) that is affixed to an asset (266) that needs to be tracked as it enters or leaves certain areas. In an embodiment E-field locator 265 may have the capability to communicate with a Wireless router 250 so that ASS 270 can monitor and configure it.

Alternatively, an Ekey 240 can be configured to expect to be within the reception range of an E-Field Locator 265 at all times and to send an alarm message when a signal from the E-Field Locator can no longer be received.

An embodiment of the Ekey device has a dosimeter 842 that measures ionizing radiation. This is very convenient and useful for office workers who work in an environment that has various degrees of ionizing radiation. Such users anyway need to carry Ekeys for access to rooms, work areas and equipment. The AS and a multipurpose Ekey can thus monitor and relate the radiation dose experienced by the Ekey user as she moves about various rooms and work locations (Ekey, Locator and EDL determine when a user entered a room and for how long) as part of the work schedule. A Pareto chart detailing radiation dose versus room can be a powerful tool to adjust work process and improve personal safety and workplace safety.

Planar Ekey

FIGS. 3A, 3B, 3C, 3D, 3E, 4A, 4B, 4C, 5A, 5B, 6A, 6B, 7A and 7B show various embodiments of the disclosure that tremendously reduces the thickness form factor of the Ekey 240 by using a battery that is extremely thin, yet one that does not interfere with the performance of the ODA (Omni directional antenna. FIGS. 14A, 14B, 14C). It should be noted that while this specification refers to use of an ODA in an Ekey 240 design, but those skilled in the art will understand that the teachings can be applied when using other types of antennas. One skilled in art can mix and match the teachings of this layout and packaging methods taught in this patent specification.

Figure 3A:
Figure 3B:
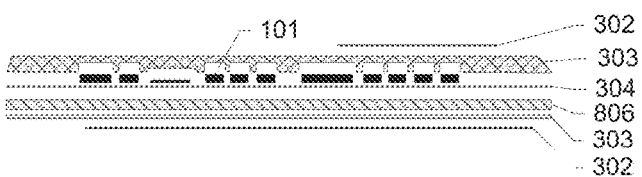

FIG. 3A depicts the cross section view of one way to realize planar (low profile) Ekey 240 comprising some or all functional blocks of FIG. 8. FIG. 3B is an exploded view of FIG. 3A teaching high density packaging layout. The packaging scheme allows flexing of the Ekey 240. The electronic components 101 are preferably assembled on one or both sides of the flexible printed circuit (FPC) 304 (I.e. one can use FPC 304 instead of a rigid substrate PCB 102). A custom low thickness battery 806 is packed on one side of the FPC 304 suitably insulated with an insulating film in between. In this embodiment the battery is of uniform thickness and thus easier to fabricate. The other side of the FPC 304 is covered with an insulating material that also acts as a protective stiffener cover 303 that has custom pockets to allow relatively snug fit with electronic components 101, thus providing strength against mechanical impact force from the flat side of the Ekey as all the force bypasses the electronic components. It provides mechanical protection to the FPC assembly with minimal addition to overall thickness. Protective stiffener cover 303 could be realized by various methods known to those skilled in art, including molding, lamination etc. whereby a plastic raw material is easily shaped into desired matrix to form the solid part. Another protective stiffener cover 303 on the side of the battery envelops the FPC 304, electronic components 101 (if any) and battery 806. In another embodiment the FPC assembly is not tightly encapsulated with protective stiffener cover 303 and battery 806, instead it is allowed to slip along the contact surface, so that when the Ekey 240 flexes it does not stress the FPC assembly. Similarly the battery 806 is not stressed by flexing of the Ekey. In another embodiment the battery 806 is packaged in narrow sections (see FIGS. 5A, 5B) that are aligned along the width of Ekey 240 to minimize stress due to flexing of Ekey. This method (in FIGS. 3A, 3B) puts least stress on FPC 304 as the FPC is located almost along the neutral stress plane of flexing, with thick protective stiffener cover on one side and an almost same thickness of battery 806 and protective stiffener cover on the other side. The flexible photovoltaic cell(s) (FPVC) 302 are stuck to the exposed outer surface of protective stiffener cover 303 to harvest ambient light energy. FPVC 302 is electrically connected to the circuit in the FPC assembly to charge an electronic store 805 in the device (not shown in this figure to avoid clutter). Further FPVC 302 is preferably chosen with a protective film to protect it from scratching from hard objects during normal use.

Figure 3C:
Figure 3D:
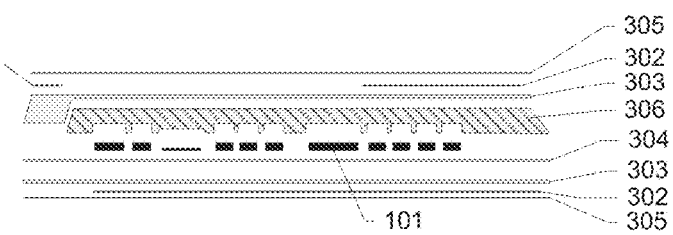
Figure 3E:
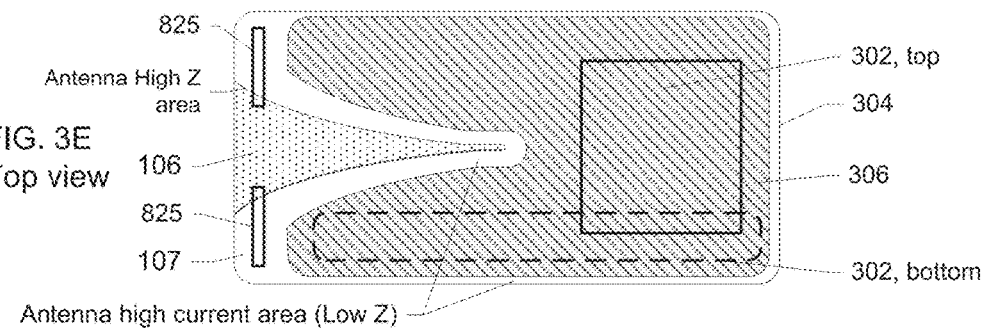

FIGS. 3C, 3D and 3E shows another embodiment of planar Ekey 240 using an ODA (Omni directional antenna). A multi-layered FPC 304 uses one layer that acts as a power layer (I.e. Ground or $V_{dd}$ supply) and is shaped to be an ODA. To maintain the same battery volume (for comparative energy capacity as a non-planer Ekey) the area of the battery must increase. However increasing the battery to the shape of the Ekey's PCB 102 (or FPC 304) may compromise the operation of the ODA. So some embodiments of this invention accomplish the objective by using a battery that is very thin (E.g. about 1 mm thick); and to maintain ODA's RF performance this disclosure teaches the battery shaped to follow the contour of the ODA ground plane but be shorter (smaller) than the ODA contour to ensure that portions of the ODA that carry large RF current largely stay confined to well defined copper substrate (part of the electronic printed circuit board) and also portions of the ODA that contribute to E field have capacitance defined by ODA copper structure. One could in another embodiment factor in the thickness of the thin battery overlaid on the ODA copper plane to operating frequency and bandwidth. Those skilled in the art would know that instead of the ODA other types of antennas could be formed by etching suitable PCB trace pattern on the PCB's conducting layer(s). Further there could be more than one antennas formed using the PCB's conducting layer(s) (non-limiting examples in FIGS. 14A, 15B, 14C) of different antenna types (E.g. bow-tie UWB antenna, loop, spiral UWB) and operating in the same or different frequency bands. As only a small fraction of the FPC 304 area is occupied by the electronic components 101, the battery 306 (instead of non-rechargeable battery, it could as well be a rechargeable battery) is made to conform to the surface presented by a FPC 304 that is loaded with components 101, this allows most efficient use of the overall available volume to maximize the energy capacity of the battery. Unlike the embodiment in FIG. 3A the conformal battery 306 is packaged on the component side of the FPC assembly, thereby most efficiently using the available volume for maximum battery capacity. The outer surface of the battery is protected by a thin protective stiffener cover 303, which in turn has place to mount the FPVC 302, as well E-field electrode 825. The bottom surface is protected by another protective stiffener cover 303 that is welded to the top protective stiffener cover 303, thus protecting the electronics from mechanical damage. Like the top protective stiffener cover 303 the bottom protective stiffener cover 303 also has a FPVC 302 to harvest light energy, and both the top and bottom surfaces are further protected by a transparent protective film 305 that is abrasion resistant yet allows easy transfer of ambient light to the underlying FPVC 303. The area not covered by FPVC 302 may further be used to imprint relevant information that is usually printed on an employee badge.

Figure 3F:
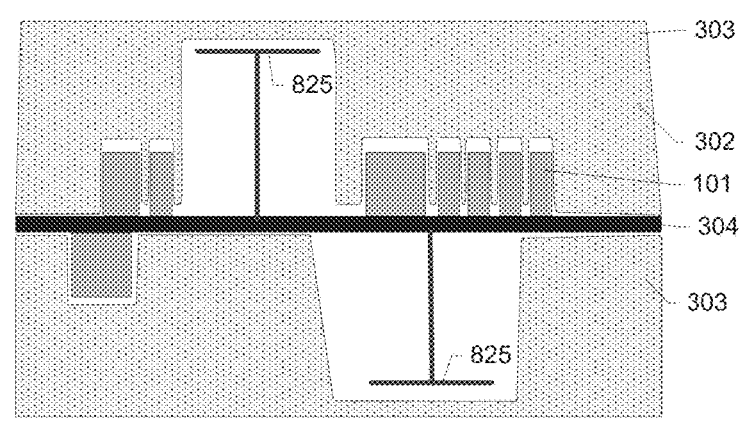
FIG. 3F shows an embodiment of E-field sensor electrode placement.

FIG. 3F shows a detailed example of the cross section view of an embodiment of E-Field electrode 825 where each side of the PCB 304 has an E-Field probe electrode 825 to sense the voltage difference between the electrode 825 and the circuit ground realized on one of the PCB copper layers. This E-field sensor arrangement is advantageous in reliably measuring the E-field on and around the human body by ensuring that at least one E-field sensor electrode is unaffected by shielding effects and interference due to proximity to conducting material on one side of the multi-functional Ekey device. Thin profile E-field sensors with height constraints suffer from poor sensitivity due to proximity to ground potential in the PCB as dense electronic packaging prevents allocating large conductor free area under the E-Field probe electrode. To overcome this problem this embodiment teaches the use of active guarding on the PCB surface under the E-Field probe, whereby a large piece of conducting surface under the probe electrodes is driven close to probe potential (i.e. is buffered) by a buffer amplifier.

Figure 4A:
Figure 4B:
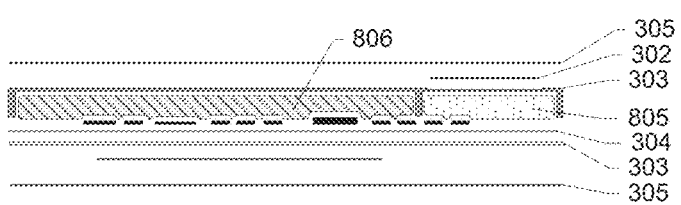
Figure 4C:
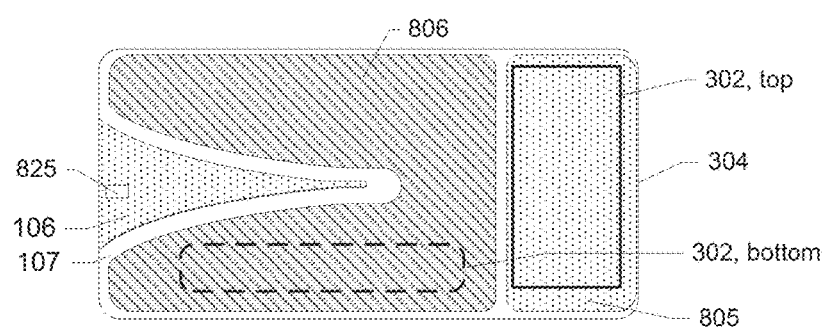

FIGS. 4A, 4B and 4C shows another embodiment of planar Ekey 240 that additionally packages ES 805. The ES 805 may or may not require conformal shape. Further the FPVC 302 is nested in a recessed pocket carved on the outer surface of protective stiffener cover 303, such that the transparent protective film 305 is almost flat across the whole surface.

In one embodiment the PPS battery 806 and/or ES 805 are RF connected to the flex circuit at select locations to reduce effect of the conformal battery on antenna radiation pattern, resonance frequency or gain.

FIGS. 5A and 5B show another embodiment of a planar Ekey 240 that packages a conformal ES 805 on the bottom side of the FPC assembly and a conformal PPS battery 806 on the other side, an EM transducer 815 is nested to one end so that it does not interfere with ODA function and FPC assembly. In an embodiment the space indicated for the EM transducer could instead be used to house Thermoelectric transducer 816 as it presents an efficient thermal path that is essential for a thermoelectric transducer. Instead of a single piece construction, the battery 306 is packaged in narrow (spliced) sections that are aligned along the width of Ekey 240 to minimize stress due to flexing of the Ekey. The FPC assembly is again located near the midpoint of thickness in the plane of least flexural stress, thus it sees little stress corresponding to improved reliability. A PE transducer 814 is located on one surface of the Ekey 240 to serve as EHVD that could be switched to also act as an acoustic transducer functioning as a loudspeaker and/or microphone.

FIGS. 6A and 6B show another embodiment of a planar Ekey 240 shown in FIGS. 5A and 5B that packages a conformal ES 805 and a conformal battery 306 on a side of the FPC assembly. It has the advantage of being very thin.

FIGS. 7A and 7B show another embodiment of a planar Ekey, that has a more generous area availability (E.g. a traditional employee badge size form factor). The additional area is used to more optimally place the E-field sensor electrode 825. E-field sensor electrode 825A is at an ideal location for E-field sensor electrode placed near an antenna whereby the wire connecting the Efield electrode passes along the symmetry line between the ends of antenna poles, thus not disturbing the antenna. The available space is also used to form a loop antenna 817. To ensure the low frequency loop antenna does not interfere with the much higher frequency main antenna (say 2.5 GHz ISM band), the loop is broken into small segments that are interconnected by a microwave block 702 that appears as open circuit to 2.4 GHz (in this example at the center frequency of the ODA) and short circuit for the intended low frequency (preferably the small segments length is shorter than ¼ wavelength). An exemplary microwave block 702 comprises a parallel tank circuit tuned at 2.4 GHz. The available area could additionally be used to place parasitic antenna element 701 (the example in the figure shows a multipurpose structure that is E-field sensor plus meandered dipole director antenna element) to supplement the main antenna 833 (in this example the main antenna is ODA 107). In some embodiment an E-field sensor electrode 825 is placed above the PCB and another E-field sensor electrode placed below the PCB (FIG. 3F); when the device is worn on the human body one large flat side of the device will be close to the body skin while the other flat side will face the free space, in such a situation this E-field sensor arrangement is advantageous in reliably measuring the E-field on or around the human body, particularly mitigating the loss of sensitivity on the sensor facing the human skin.

Tracking

An embodiment of this invention teaches combined use of Time of flight (to get distance estimate) and steerable beam (to get azimuth direction estimate) to position the location of the tag. This method is much more cost effective as a standalone reader can provide positioning without requiring complex cabling or communication between multiple readers. Unlike prior art methods (E.g. Aviation navigation aids do not have low battery energy constraints like an Ekey. Unlike aviation radio navigation aids like VoR (Very high frequency omni range), TACAN (Tactical air navigation system) and Secondary surveillance radar (SSR), this disclosure teaches a method where Ekey 240 and Tracker 1002 have to first discover each other and then establish communication (for example using methods taught in US 20100040120 Low power radio communication system, US 20130136046 Establishment of wireless communications), authenticate each other, and then distance is estimated by the stationary Tracker 1002 (using an RSSI-based method or a Time of Flight measurement protocol), and bearing determined by Tracker. Optionally the Ekey 240 is also informed by Tracker 1002 of its estimated position. Again this disclosure discloses a method that is different from Ground control Precision Approach using Precision approach radar (PAR), as in a PAR system all the transmission and measurement is done by radar without any co-operation by the target (aircraft).

Figure 10B:
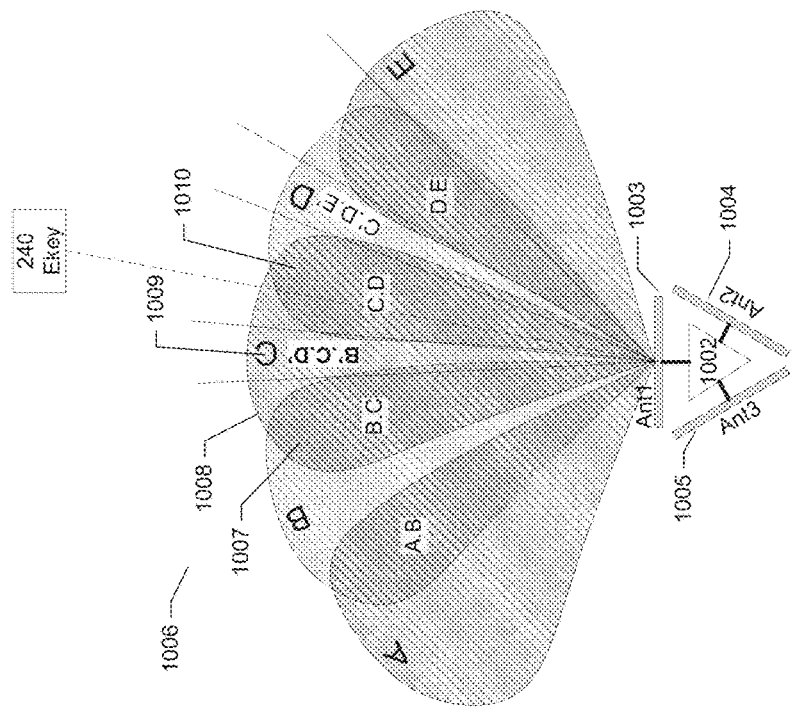
FIGS. 10A, 10B, 10C show tracker layout and its antenna beams.
Figure 10A:
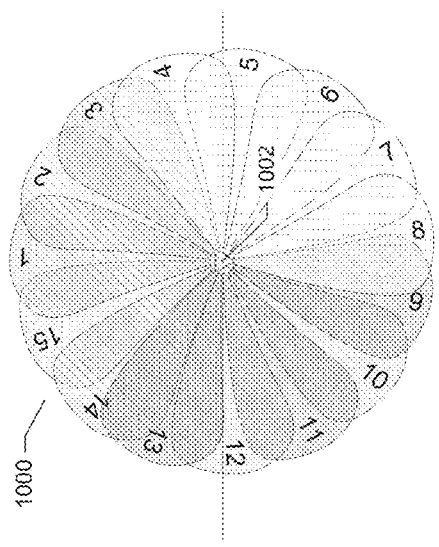

FIG. 10A shows a system to track the location the Ekey. The tracker 1002 is a specialized variant of locator 260 with high power radio and directional antennas with orthogonal polarization capability so that it can communicate with an Ekey's antenna (including those Ekeys that use ODAs) irrespective of the relative orientation of the Ekey 240 (I.e. user is not required to ensure the Ekey is in a particular orientation). To conserve an Ekey's energy the tracker periodically scans for presence of an Ekey (typically 15 second period). The Ekey has a coarse clock but it does not have a chronometer or a precise clock due to cost, power, energy and space considerations. An exemplary tracker 1002 is enclosed in a Radome 1001 and has multiple directional antennas.

In the FIG. 10A example, Tracker's 1002 full 360° coverage is provided by 15 antenna beams 1000. Ekey's azimuthal position is resolved by comparing its communication signal strength from multiple antenna beams. This exemplar arrangement provides 8° angular resolution corresponding to 45 sectors {8°=360/(15*3), as each beam is subdivided into 3 portions due to overlapping of beams}

The tracker 1002 polls for presence of Ekey 240 in its coverage area using different antenna beams to establish communication (for example by using methods taught in US 20100040120 Low power radio communication system, US 20130136046 Establishment of wireless communications).

After making contact with Ekey 240 and mutual authentication by cryptographic means, the Ekey 240 and tracker 1002 estimate mutual distance by an RSSI-based method;

communicating using a calibrated transmitter power (plus antenna gain) and measuring receiver signal strength measurement (RSSI). Alternatively it can use a ToF (Time of flight) measurement for distance ranging. In another embodiment it uses both RSSI and ToF technique for accurate azimuth and range estimation, respectively (particularly in an environment that has significant RF reflection due to buildings etc).

The omni-directional response of the ODA in an Ekey 240 enables distance estimation using an RSSI-based method (as per SecureALL patent application: US20120169543) when the Ekey 240 is located within an uniformly illuminated solid angle of the tracker's antenna (say 1.5 dB beam-width of the antenna).

Figure 10C:
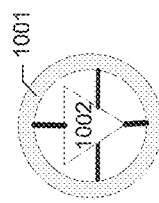

Overlapping antenna beams allow further azimuth resolution of the Ekey's 240 position. FIG. 10A shows the beam pattern from a set of directional antennas whose azimuthal beam width is 30° with overlapping coverage. Instead of using 15 immobile antennas, one could alternatively use a tracker with a physically steered antenna. (See FIG. 10C, Cylindrical shaped steerable beam antenna array formed by triangularly arranged antenna array that revolves inside the Radome 1001).

FIG. 10B is an embodiment of the system in FIG. 10A, where the 15 beams of 24° width are realized by three antennas arrays (Ant1 1003, Ant2 1004 and Ant3 1005). The antenna is a phase steered antenna with beam width of 24° where beam 1008 can be phased steered 1006 on either side by ±24° (B, D) and ±48° (A, E) from its normal broadside direction)(0°). Phase steered antenna with greater beam steering resolution can be realized that easily yields finer azimuth position estimation.

Azimutal position estimation with a resolution that is finer than antenna beam width:

a) Tracker 1002 communicates with an Ekey 240 using Antenna beam C.

b) Tracker 1002 tries to communicate with the Ekey 240 using beam A, E and neighboring beam B and D measuring the RSSI in the process (let us say it manages to communicate using beam B, C and A) call it as RSSIb, RSSIc, RSSId).

c) Finer azimuthal position of Ekey is estimated by following logic:
  i. When (RSSIc>RSSIb+3) and (RSSIc>RSSId+3) its azimuth position is dead on (bore-sight) and within a fraction of the antenna beam width (FIG. 10B, area marked B'.C.D' 1009).
  ii. When (RSSIc≈RSSId) its azimuth position is on the beam overlapping region of the antenna beam C and D (FIG. 10B, area marked C.D 1010).
  iii. When (RSSIc≈RSSIb) its azimuth position is on the beam overlapping region of the antenna beam C and B (FIG. 10B, area marked B.C 1007).

One can estimate even finer resolution by knowing a priroi the beam's radiation pattern, and mathematically estimating the azimuth position by measuring the RSSI from the main beam 1008 and neighboring beams.

An embodiment of this invention uses a steerable antenna beam using an active electronically scanned array (AESA) or a passive electronically scanned array (PESA) that allows greatly improved azimuth position. Given that beam shaping and null suppression can be easily done using the AESA and PESA, azimuth estimation is greatly improved by measuring rapid change of RSSI as the Ekey 240 position falls on the edge of the beam.

An embodiment of this invention teaches the combined use of Time of flight (E.g whereby the Ekey 240 responds to Tracker 1002 communication with a known delay, and the tracker factors in that delay in when it times the response from Ekey. This method is well known in art such as receiver correlation, pulse compression, Ultra Wide Band communication etc.). This method is much more cost effective as a standalone reader can provide positioning without requiring complex cabling or communication between multiple trackers that are based on a triangulation method (angular, distance or a combination). This method also allows use of a power and energy constrained Ekey 240 to realize a position tracking system.

Tracker 1002 can additionally communicate with the Ekey 240, and ask for temporary activation of GPS electronics 829 to get its coordinates, and send the coordinate information to the tracker. This is particular suitable for trackers that provide outdoor coverage.

Embodiments of the disclosure described above are only exemplary. Where Ekey is described in the specification, it could also be applied to other types of devices or appliances. One skilled in the art may recognize various alternative embodiments from those specifically disclosed. Those alternative embodiments are also intended to be within the scope of this disclosure.

The invention claimed is:

1. A device comprising an electronic key comprising at least one wireless communication interface, the electronic key being operable as an access control key to unlock an electronic lock when the electronic key is placed in proximity of the electronic lock and the electronic lock has been configured to allow temporal access to the electronic key, the electronic key being also operable to perform at least two of the following additional functions: a) sense an electric field by an electric field sensor which is part of the electronic key, and process data obtained by sensing the electric field, and wirelessly send data obtained by the processing; b) in response to activation of a switch that is part of the key, wirelessly communicate a distress signal to a recipient device operable, upon receipt of the distress signal, to determine a location of the electronic key by performing a measurement performed on a signal transmitted between the device and the electronic key; c) sense the electronic key's motion by a spatial motion sensor which is part of the electronic key, thereby obtaining data related to the electronic key's acceleration and/or spatial orientation, and process data obtained by sensing the electronic key's motion, and wirelessly send data obtained by the processing of data obtained by the sensing of the electronic key's motion.

2. The device of claim 1, configured to generate an inactivity alarm message based on one or more signal patterns from one or more sensors each of which is one of a group consisting of:
  a) an accelerometer;
  b) a rate gyro;
  c) a mechanical motion switch;
  d) an E-field sensor;
  e) a light sensor.

3. A system comprising an application server and wireless network routers operable to communicate with the device of claim 2 that additionally factors in user's usual daily activity pattern.

4. The device of claim 1, the device being operable to perform function b), and being operable to generate the distress signal in response only to a number of switch activations which is at least as big as a user-configurable number, and only within a user-configurable time period.

5. The device of claim 1, operable to require, and to perform, user authentication at expiration of a predefined period of time or upon initiation of a privileged operation using the device.

6. The device of claim 5 wherein the authentication is successfully done by one or more of:
   a) putting the device in proximity of another pre-authenticated personal device;
   b) putting the device in proximity of a predefined smart phone.

7. An apparatus comprising a multi functional device encapsulated in a solid insulator matrix, the multi functional device comprising:
   a) a printed circuit board that has a first surface and a second surface opposite to the first surface, the first and second surfaces being planar and extending along a plane of the printed circuit board, the printed circuit board having at least one printed trace antenna imprinted using at least part of one or more conducting layers;
   b) electronic circuits comprising electronic components installed on one or both of the first and second surfaces of the printed circuit board and interconnected by the printed circuit board;
   c) a first electric energy storage device extending along the plane of the printed circuit board and having a first surface adjacent to the first surface of the printed circuit board and conformal to one or more of said electronic components located between the first electric energy storage device and the printed circuit board;
   wherein the multi functional device extends along the plane of the printed circuit board.

8. The apparatus of claim 7 wherein the multi functional device further comprises a second energy storage device located on an opposite side of the printed circuit board from the first electric energy storage device.

9. The apparatus of claim 8 wherein the second electric energy storage device comprises a surface extending along the plane of the printed circuit board and conformal to the one or more of said electronic components located between the second electric energy storage device and the printed circuit board.

10. The apparatus of claim 8 above where the printed circuit board is located approximately in the middle between the first and second surfaces of the multi functional device.

11. The apparatus of claim 7 wherein the printed circuit board is a flexible printed circuit.

12. The apparatus of claim 7, further comprising one or more energy harvesting photo-voltaic cells located on exterior surface(s) of the insulator matrix.

13. The apparatus of claim 7 further comprising an E-field sensor electrode located near an exterior surface of the insulator matrix.

14. A structure comprising an electronic key constructed to operate from battery energy and energy harvested by one or more transducers comprising an electro-mechanical transducer which is a piezo electric and/or electrostrictive transducer; wherein the electronic key is planar, and the mechanical transducer is pre-stressed along the electronic key's length (where length is greater than width) to abate wrinkle formation in a compressive stress of the mechanical transducer in at least one planar direction.

15. A structure comprising an electronic key constructed to operate from battery energy and energy harvested by one or more transducers comprising an electro-mechanical transducer which is a piezo electric and/or electrostrictive transducer; wherein the one or more transducers include a transducer pair of a piezo electric transducer and an electrostrictive transducer that are mechanically connected together in series; where in the transducer pair, the piezo electric transducer's energy is used to DC (direct-current) bias the electrostrictive transducer.

* * * * *